US012667904B2

(12) United States Patent
Dykstra et al.

(10) Patent No.: US 12,667,904 B2
(45) Date of Patent: Jun. 30, 2026

(54) SYSTEM FOR HEATING COMPONENTS FOR CURING AND BONDING MULTI-COMPONENT STRUCTURES

(71) Applicant: Temper IP, LLC, Rockford, MI (US)

(72) Inventors: William C. Dykstra, Rockford, MI (US); Luke A. Martin, Wyoming, MI (US)

(73) Assignee: Temper IP, LLC, Rockford, MI (US)

( * ) Notice: Subject to any disclaimer, the term of this patent is extended or adjusted under 35 U.S.C. 154(b) by 1171 days.

(21) Appl. No.: 17/651,430

(22) Filed: Feb. 17, 2022

(65) Prior Publication Data

US 2025/0332653 A1 Oct. 30, 2025

Related U.S. Application Data

(60) Provisional application No. 63/200,187, filed on Feb. 19, 2021.

(51) Int. Cl.
*H05B 6/10* (2006.01)
*B23K 13/01* (2006.01)
(Continued)

(52) U.S. Cl.
CPC ............... *B23K 13/01* (2013.01); *B32B 5/02* (2013.01); *B32B 37/06* (2013.01); *H05B 6/08* (2013.01);
(Continued)

(58) Field of Classification Search
CPC ........... B23K 13/01; B32B 5/02; B32B 37/06; B32B 2262/106; H05B 6/08; H05B 6/101;
(Continued)

(56) References Cited

U.S. PATENT DOCUMENTS 3,351,501 A 11/1967 Aspden
3,390,986 A 7/1968 Stenerson
(Continued)

FOREIGN PATENT DOCUMENTS

EP 0025040 B1 2/1983
EP 0184760 A2 6/1986
(Continued)

OTHER PUBLICATIONS

Goh, "The Decelopment of Novel Multifunctional Ti—Ta—Nb—Zr Quaternary Alloy with an e/a of 4.24 via Powder Metallurgy for Low Young's Modulus" Aug. 2014, pp. 1-232, p. 176, para 2-para 3, p. 151, para 4, p. 110, para 1, p. 47, para 2, p. 55, para 1, p. 57, para 1-para 2, p. 58, para 1-para 2, p. 51, para 1, p. 34, para 1, p. 179, para 2.

*Primary Examiner* — Quang T Van
(74) *Attorney, Agent, or Firm* — HONIGMAN LLP

(57) ABSTRACT

An adaptable heating source includes an insulating substrate. A plurality of heating elements are at least partially disposed within the insulating substrate. The plurality of heating elements, when energized, generate heat. Each heating element of the plurality of heating elements includes a ferromagnetic material and an electrically conductive material. The ferromagnetic material has a Curie temperature. When the plurality of heating elements are energized, the plurality of heating elements generate heat at a temperature that does not exceed the Curie temperature. An alternating current energizes the plurality of heating elements to generate heat at the temperature that does not exceed the Curie temperature.

25 Claims, 19 Drawing Sheets

(51) Int. Cl.
    *B32B 5/02*                (2006.01)
    *B32B 37/06*             (2006.01)
    *H05B 6/08*               (2006.01)
    *H05B 6/44*               (2006.01)

(52) U.S. Cl.
    CPC ............. *H05B 6/101* (2013.01); *H05B 6/105*
             (2013.01); *H05B 6/44* (2013.01); *B32B*
             *2262/106* (2013.01); *B32B 2310/0812*
             (2013.01); *H05B 2206/023* (2013.01)

(58) Field of Classification Search
    CPC .... H05B 6/105; H05B 6/44; H05B 2206/023;
                            B23B 2310/0812
    USPC ........ 219/633, 635, 636, 637, 643, 645, 649
    See application file for complete search history.

(56)                    References Cited

U.S. PATENT DOCUMENTS

| | | | |
|---|---|---|---|
| 3,984,267 | A | 10/1976 | Craford et al. |
| 4,594,219 | A | 6/1986 | Hostatter et al. |
| 4,744,943 | A | 5/1988 | Timm |
| 4,871,621 | A | 10/1989 | Bagley et al. |
| 4,983,804 | A * | 1/1991 | Chan .................. H05K 13/0465 |
| | | | 219/616 |
| 5,622,745 | A | 4/1997 | Sloan et al. |
| 5,730,914 | A | 3/1998 | Ruppman, Sr. |
| 6,224,816 | B1 | 5/2001 | Hull et al. |
| 6,495,265 | B1 | 12/2002 | Krebs et al. |
| 6,744,342 | B2 * | 6/2004 | Decristofaro ....... H01F 1/14775 |
| | | | 335/297 |
| 6,986,381 | B2 | 1/2006 | Ray et al. |
| 7,905,128 | B2 | 3/2011 | Matsen et al. |
| RE42,329 | E | 5/2011 | Fuerstenau et al. |
| 8,383,998 | B1 | 2/2013 | Matsen et al. |
| 9,457,404 | B2 | 10/2016 | Matsen et al. |
| 9,930,729 | B2 | 3/2018 | Matsen et al. |
| 10,179,940 | B2 | 1/2019 | Kirkwood et al. |
| 2002/0056291 | A1 | 5/2002 | Schultz et al. |
| 2002/0106250 | A1 | 8/2002 | Murakawa et al. |
| 2002/0175006 | A1 | 11/2002 | Findley et al. |
| 2004/0091694 | A1 | 5/2004 | Holzer et al. |
| 2005/0012231 | A1 | 1/2005 | Olsson et al. |
| 2008/0237403 | A1 | 10/2008 | Kelly et al. |
| 2010/0071539 | A1 | 3/2010 | Boczek et al. |
| 2011/0070119 | A1 | 3/2011 | Belhadjhamida et al. |
| 2012/0288583 | A1 | 11/2012 | Segura Moreno et al. |
| 2013/0181061 | A1 | 7/2013 | Carpenter et al. |
| 2013/0330139 | A1 | 12/2013 | De Reynal |
| 2014/0314977 | A1 | 10/2014 | Weinhold |
| 2015/0260483 | A1 | 9/2015 | Wibby et al. |
| 2015/0321250 | A1 | 11/2015 | Xu |
| 2016/0305262 | A1 | 10/2016 | Durocher et al. |
| 2017/0095861 | A1 | 4/2017 | Dykstra et al. |
| 2018/0229463 | A1 | 8/2018 | Hull et al. |
| 2018/0297122 | A1 | 10/2018 | Hadidi et al. |
| 2020/0055115 | A1 | 2/2020 | Caudill |
| 2021/0146437 | A1 | 5/2021 | Danis et al. |
| 2023/0084714 | A1 | 3/2023 | Golightly et al. |

FOREIGN PATENT DOCUMENTS

| | | |
|---|---|---|
| EP | 2363619 A2 | 9/2011 |
| WO | 2019246257 A1 | 12/2019 |
| WO | 2021159150 A1 | 8/2021 |
| WO | 2022213078 A1 | 10/2022 |

* cited by examiner

FERROMAGNETIC
12 MATERIAL

14 INSULATION

16 ELECTROMAGNETIC
COIL OR LITZ WIRE

110

112

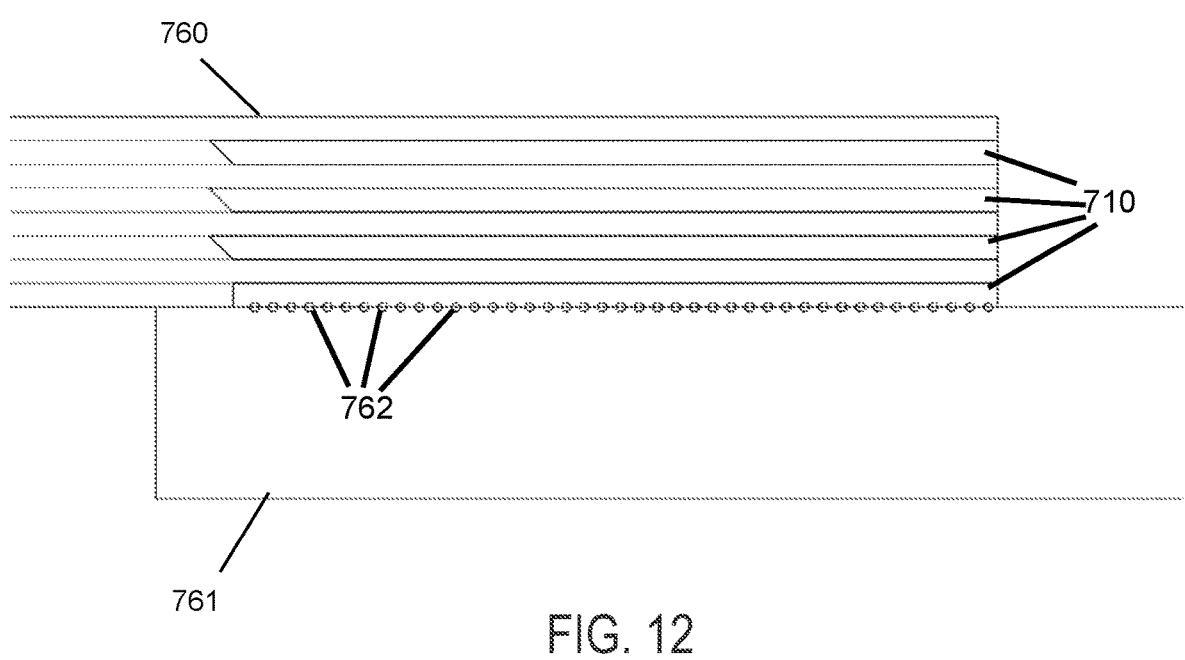
FIG. 12
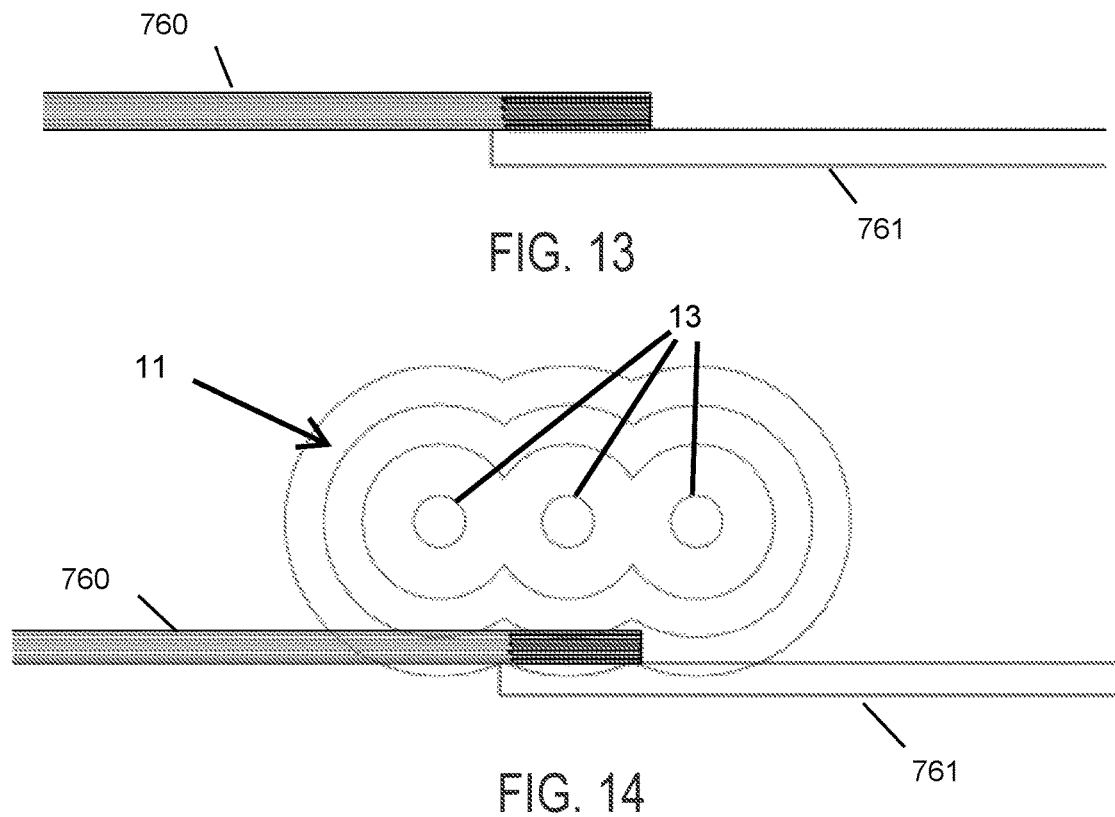
FIG. 13
FIG. 14

SYSTEM FOR HEATING COMPONENTS FOR CURING AND BONDING MULTI-COMPONENT STRUCTURES

CROSS REFERENCE TO RELATED APPLICATION

The present application claims the filing benefits of U.S. provisional application Ser. No. 63/200,187, filed Feb. 19, 2021, which is hereby incorporated herein by reference in its entirety.

FIELD OF THE INVENTION

The present invention relates generally to a method and system for the heating of an object or heated joining, welding, bonding, co-bonding, hot-bonding, fusing, or affixing of two or more components, and more specifically to a method and system for the heating of an object or heated joining, welding, bonding, co-bonding, hot-bonding, fusing or affixing of two or more components using an electromagnetic field to heat one or more ferromagnetic structures.

BACKGROUND OF THE INVENTION

Given the proper conditions, an electrically conductive ferromagnetic substance will experience heating when subject to a sufficiently high-frequency electromagnetic field.

Ferromagnetic materials such as iron, nickel, cobalt, and their many alloys, have a composition-specific temperature, the Curie temperature, above which their relative magnetic permeability ($\mu_r$) decreases until it is approximately equal to that of ordinary air or a vacuum, and electromagnetically induced ferromagnetic heating ceases to occur. The electromagnetic heating process is capable of extremely efficient and rapid energy transfer, and electromagnetic heating has been demonstrated to produce temperature rises of hundreds of kelvins in less than a second.

Electromagnetic fields can pass through many electrical insulators, such as air, glass, plastics, and non-metallic ceramics, without heating them, and if conductive materials, such as ferrous alloys, copper, aluminum, etc., are located in the electromagnetic field, a field of the appropriate frequency range will heat only the conductive materials.

SUMMARY OF THE INVENTION

A ferromagnetic heating element includes an electrically conductive material, such as a wire or strip or electromagnetic coil or Litz wire, with a ferromagnetic material disposed at the conductive material. The electrically conductive material is electrically powered via a power source and, when electrically powered, emanates a magnetic field. The ferromagnetic material, when disposed at the conductive material, is placed within the magnetic field and heats via induction heating. The ferromagnetic material has a known Curie temperature point. The ferromagnetic material heats to or near its Curie temperature (i.e., to a temperature that is at or below the Curie temperature) when the conductive material is electrically powered.

Optionally, a ferromagnetic heating system may include a ferromagnetic heating element disposed at a substrate. The ferromagnetic heating element includes an electrically conductive material and a ferromagnetic material. A power source is configured to electrically power the ferromagnetic heating system. Optionally, the ferromagnetic material is disposed at an exterior surface of the electrically conductive material, such as wrapped or wound or coated or otherwise covering the conductive material.

The ferromagnetic heating element may be disposed in or at a heating blanket, in which case the heating element may be a plurality of ferromagnetic wires disposed within the volume of the blanket. The ferromagnetic wires may have the same Curie temperatures or a system may provide ferromagnetic wires with a plurality of different Curie temperatures. Ferromagnetic wires with the same Curie temperature may be grouped together in the volume of the heating blanket or may be spaced apart, such as evenly, throughout the volume of the heating blanket. For example, the ferromagnetic wires may be in a first group and a second group where the first and second groups have first and second Curie temperatures, respectively.

All of the ferromagnetic wires within the heating blanket may be parallel to one another. The wires may be arranged such that the first group and second group of ferromagnetic wires alternate with one another. The ferromagnetic wires may also be arranged in more than one plane. The more than one plane of wires may be parallel to one another or angled or perpendicular to one another. The more than one plane of wires may have the same or different Curie temperatures from one another. The planes of wires may be separable and removable from the substrate of the heating blanket. The planes of wires may be separated via insulation material or insulation layers that may be integrated or separable from the substrate of the heating blanket.

Optionally, a laminated structure may include ferromagnetic heating elements and a method for joining components with the laminated structure. The ferromagnetic heating element may be disposed at a mating surface of the laminated structure. The laminated structure is used to apply heat to one or more components in order to join the component to the structure and/or one or more other components. The laminated structure applies heat when a magnetic field is applied to the laminated structure. The magnetic field heats the ferromagnetic heating element via induction heating. Optionally, the ferromagnetic heating element may include an electrically conductive material, in which case the electrically conductive material may provide the magnetic field. The electrically conductive material may receive and disperse traverse flux currents from an exterior magnetic field source.

These and other objects, advantages, purposes and features of the present invention will become more apparent upon review of the following specification in conjunction with the drawings.

BRIEF DESCRIPTION OF THE DRAWINGS

FIG. 12 is a cross-sectional view of a component comprising ferromagnetic wires;

FIG. 13 is a cross-sectional view of the component of FIG. 12;

FIG. 14 is a cross-sectional view of the component of FIG. 12 with a magnetic field applied to the ferromagnetic wires;

DESCRIPTION OF THE PREFERRED EMBODIMENTS

Figure 1:
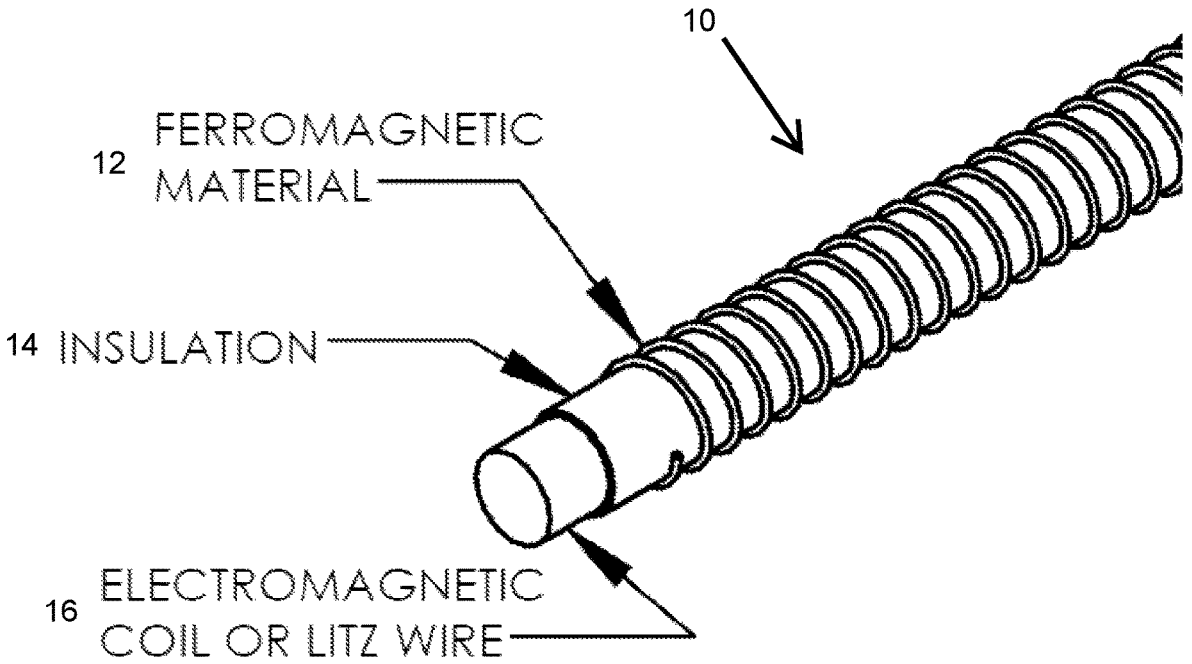
FIG. 1 is a perspective view of a ferromagnetic wire having a ferromagnetic material disposed around insulation material that is disposed around an electromagnetic coil or Litz wire.

The present invention provides a process that utilizes characteristics of induction heating to provide controlled, precise, safe, and unobstructed temperature regulation in the joining, bonding, or coupling of two or more components. An electrically conductive wire (such as a copper wire or an electromagnetic coil or Litz wire) is wrapped, surrounded, or otherwise covered in a ferromagnetic material (FIG. 1). These may be referred to as ferromagnetic wires. A layer of insulation may be disposed between the wire and the ferromagnetic material. When an electric current is run through the wire, a magnetic field is created which causes the surrounding ferromagnetic material to heat via induction heating. When or if or as the ferromagnetic material approaches a temperature at its Curie point, the ferromagnetic loses its magnetic properties and thus stops heating. If the temperature of the material subsequently drops below or decreases from the Curie point, the material begins to regain its magnetic properties and heats again towards or to its Curie point. Thus the temperature of the ferromagnetic material may be controlled by electrically charging the central wire, creating a magnetic field to which the ferromagnetic material is subjected so that the ferromagnetic material may reach and maintain a temperature at or near its Curie point. Such a system may be used to apply heat to a substance or environment by disposing one or more ferromagnetic wires in the environment, in the substance, around, near, or on a surface of the substance or any other suitable method. The heat provided by such a system may be controlled via the alloy content of the ferromagnetic material (which alters the Curie point of the material). Thus, the maximum temperature of a ferromagnetic wire covered in a ferromagnetic material having a given alloy content will be at or near the Curie point of such a ferromagnetic material. In situations in which the ferromagnetic material is heated via magnetic field not carried by the central conductive wire, the central wire may effectively carry away or disperse stray electric currents (or transverse flux currents). In this way, the ferromagnetic material becomes even smarter. As discussed below, such systems and properties may be used in a variety of applications not limited by this disclosure, but including multi-ferromagnetic Curie temperature systems such as heating blankets or pads, laminated structures to avoid heating effects from electromagnetic fields and to heat the interface between two thermoplastic materials, and/or as a ferromagnetic transverse flux current dispersal method.

As exemplified in FIGS. 3-7, a zoned heating blanket may be provided for low-cost curing, co-curing, bonding, co-bonding, and hot-bonding composite and other multi-component structures. Within the aerospace industry, composite structures are present in structures that range from expendable drones to bombers to space launch vehicles. Regardless of the application, the manufacturing and performance of such craft are suffering because intelligent heating solutions are not available and conventional technologies cannot maintain required processing temperature tolerances such as ±10° F. The present invention provides a multi-zone heating blanket that uses electromagnetic heating and one or more ferromagnetic heating elements or wires to target one or more processing temperatures within a required temperature tolerance.

The combination of ferromagnetic element(s) and electromagnetic heating provides a self-regulating heating element because an electric current may be passed through an electrically conductive wire around which a ferromagnetic material is wrapped. As the current passes through the wire, a magnetic field is created that (through induction heating) heats the ferromagnetic material around the wire to or near its Curie temperature. As the temperature of the ferromagnetic material approaches the material's Curie point, the material loses its magnetic properties and stops heating all together at its Curie point. If the material drops in temperature, it begins to regain its magnetic properties and thus begins heating again until it once again loses its magnetic properties at or near its Curie temperature. Thus the ferromagnetic wire is "self-regulating" in that, when an electric current is passed through the wire to create and maintain a magnetic field, the ferromagnetic material heats to, and substantially maintains a temperature at or near its Curie point.

The heating element may be incorporated into a blanket of significant area, effectively ensuring the entire area of the blanket becomes self-regulating. By incorporating more than one heating element into a blanket area, multiple self-regulating temperatures can be achieved.

The heat source in the heating element is made from a metal, such as a ferromagnetic material, that becomes non-magnetic at a specific temperature (i.e., the Curie temperature). Once an area or portion of the heating element reaches the Curie temperature, that specific area no longer accepts energy from the electromagnetic system and the heating stops while the surrounding areas or portions continue to heat to and/or near the Curie temperature. Once the Curie temperature is reached, any portion of the blanket or heating element where the temperature drops below the Curie temperature becomes magnetic again and that portion once again accepts energy from the electromagnetic system, heating again until the Curie temperature is reached. In this way, self-regulation of the heating element with a temperature tolerance (such as ±10 degrees F.) is achieved by correlating the Curie temperature of the system to the required processing temperature. The Curie temperature is specific to the magnetic properties of the heating element, such as the alloy composition of the metal used, and thus may be controlled by altering the materials used in the system based on magnetic properties of the chosen materials.

The electromagnetic field strength is generated by a running a high-frequency alternating current (AC) through a coil or a Litz wire. The effect is much the same as an electromagnet in that the electrical current creates a magnetic field. The magnetic field has a polarity (a north pole and a south pole). When the current in the coil alternates from positive to negative, the magnetic poles alternate as well. A system in accordance with the present invention may use an AC power source that runs at high frequency, such as 400,000 Hz. Optionally, the electromagnetic field may be generated by running and pulsating a direct current (DC) power supply at a high frequency, such as, for example, 400,000 Hz. The DC current may be pulsed such as between 500 times per second and 5,000,000 times per second or such as between 3,000 times per second and 500,000 times per second. Generally, AC current may be preferable for systems of induction heating, but a power supply utilizing pulsating DC current may be constructed at significantly lower costs than AC power supplies operating at similar frequencies.

Additionally, the magnetic field easily interacts with any magnetic material around the coil. In the case of the ferromagnetic wires within the heating blankets, the magnetic material is the ferromagnetic material surrounding the wire or heating element. The interaction between the magnetic field and ferromagnetic material results in the negatively charged electrons in the ferromagnetic material being driven towards one of the magnetic poles. When the magnetic poles switch, the electrons are forced to flow and, with the proper frequency, can be used to create the heating element in the ferromagnetic material, and, therefore, the blanket.

Referring now to FIG. 1, the ferromagnetic heating element 10 includes a ferromagnetic material 12, which is wrapped around but insulated (via a layer of insulation 14) from or in close proximity to, the electromagnetic coil or Litz wire 16. The ferromagnetic material 12 has a controlled Curie temperature. The Curie temperature is a material property that indicates the temperature at which a magnetic material becomes non-magnetic. Additionally, the Curie temperature can be changed by controlling the alloy content in the magnetic material. The implication is that when a magnetic material is placed inside a magnetic field, every part of the material will heat until it reaches the Curie temperature. Once the Curie temperature is reached at a given area or portion of the material, that area or portion of the magnetic material becomes non-magnetic (i.e., it no longer reacts to the magnetic field) and the heating at that area or portion of the material stops. If the temperature of any portion of the magnetic material drops below the Curie point, that specific portion becomes magnetic again and heats until it becomes non-magnetic. The result is a very precisely controlled temperature across the entire surface. The temperature range of the process can range from −300 degrees F. to 2100 degrees F., but generally is used in the 125 degrees F. to 400 degrees F. range.

The combination of electromagnetic heating and ferromagnetic material technology allows for intelligent and adaptive heating. By controlling the alloy content of the heating elements, the temperature can be adjusted to match the desired processing temperature specifically targeted for co-bonding, co-curing and hot-bonding given composite materials such as thermoplastics, carbon-fiber based composites, metal alloys, or any suitable application. Anticipated benefits include temperature regulation to within a precise temperature range (such as ±7 degrees F. or such as ±10 degrees F.), low possibility of overheating, no dependence on software or sensors for control, and manufacturing procedures and techniques that are similar to traditional resistive heating blankets.

The broad range of applications and interest from various industrial partners show the problem is not specific to certain customers or end users. Rather, the ability to hold precise temperature ranges (such as ±10 degrees F.) is a challenge that spans many industries and a problem which the ferromagnetic wires 10 and applications such as heating blankets (FIGS. 3-7) help to solve.

While temperatures below the Curie temperature can be achieved and regulated using various control schemes, a tight temperature tolerance may be achieved most successfully dependent on a material property of the heating element as the heating element is self-regulating to a very narrow temperature range at the Curie temperature of the material. Although it should be understood that temperature tolerances not surrounding the material's Curie temperature may be achieved with the systems and methods of the present invention and that this disclosure is not meant to be limiting as to the application of such ferromagnetic wires and heating elements, temperature tolerances at or near the ferromagnetic material's Curie temperature will be discussed throughout. Additionally, multiple heating elements, each with its own characteristic Curie temperature, can be incorporated into a heating blanket or heated zone to precisely control the processing temperature at multiple set points. For example, a co-bonding operation may specify a 150 degrees F. temperature dwell followed by a 250 degrees F. temperature dwell followed by a 350 degrees F. temperature dwell with each dwell period holding the temperature for a set period of time. In this situation, multiple heating elements can be incorporated into a heating area wherein a specific heating element targets a specific dwell temperature.

Thus, and such as shown in FIG. 1, a heating element 10 includes a ferromagnetic element 12, such as a wire formed from a ferromagnetic material, wrapped around an electromagnetic coil or Litz wire 16. Insulation 14, such as a rubber sheath, is disposed between the Litz wire 16 and the ferromagnetic element 12. The ferromagnetic element 12 may be evenly distributed along a length of the heating element 10 so as to provide equal or even distribution of heat along the length of the heating element 10.

Figure 2:
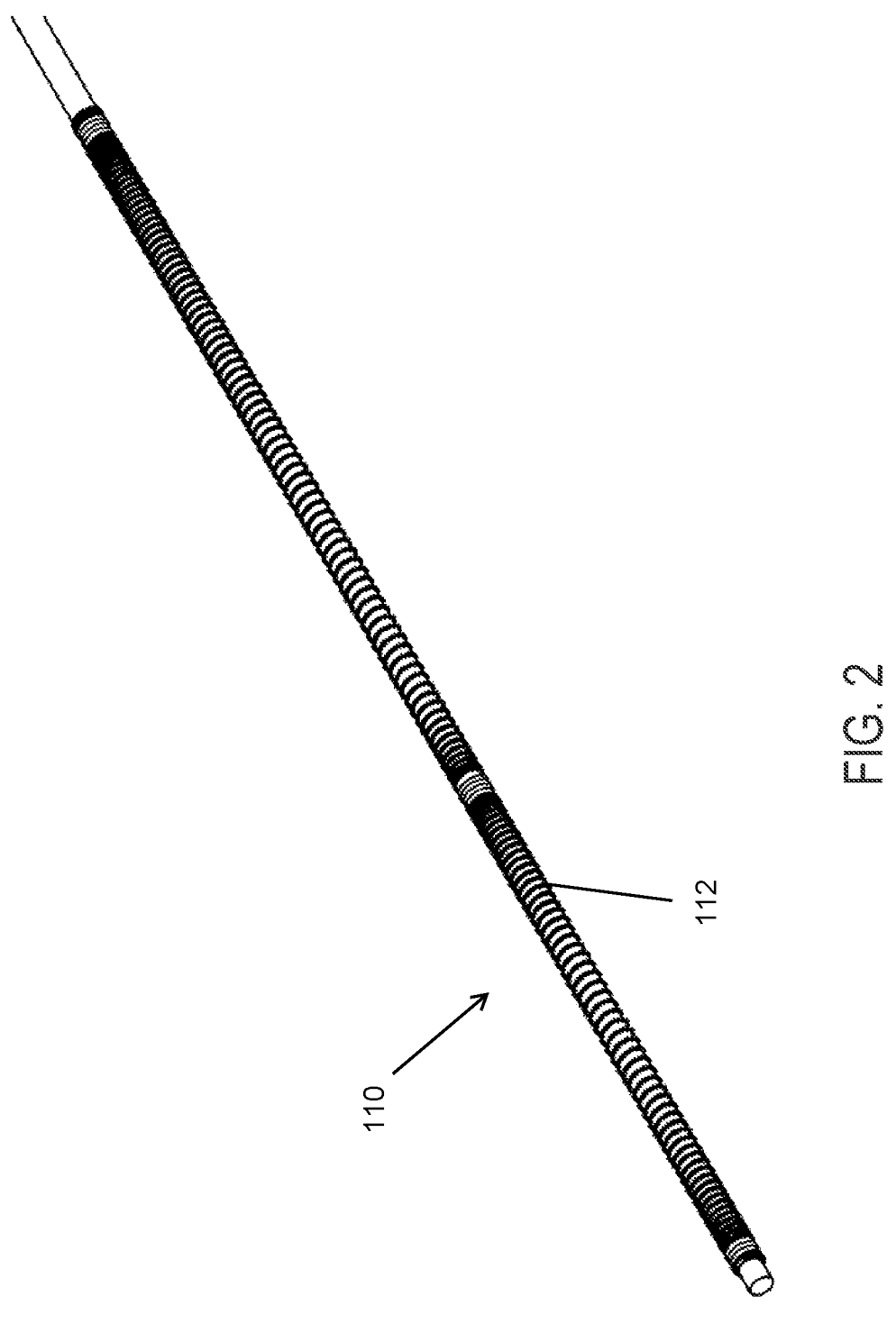
FIG. 2 is a perspective view of another ferromagnetic wire having the ferromagnetic material wrapped around the insulation material with a varied pitch.
Figure 3:
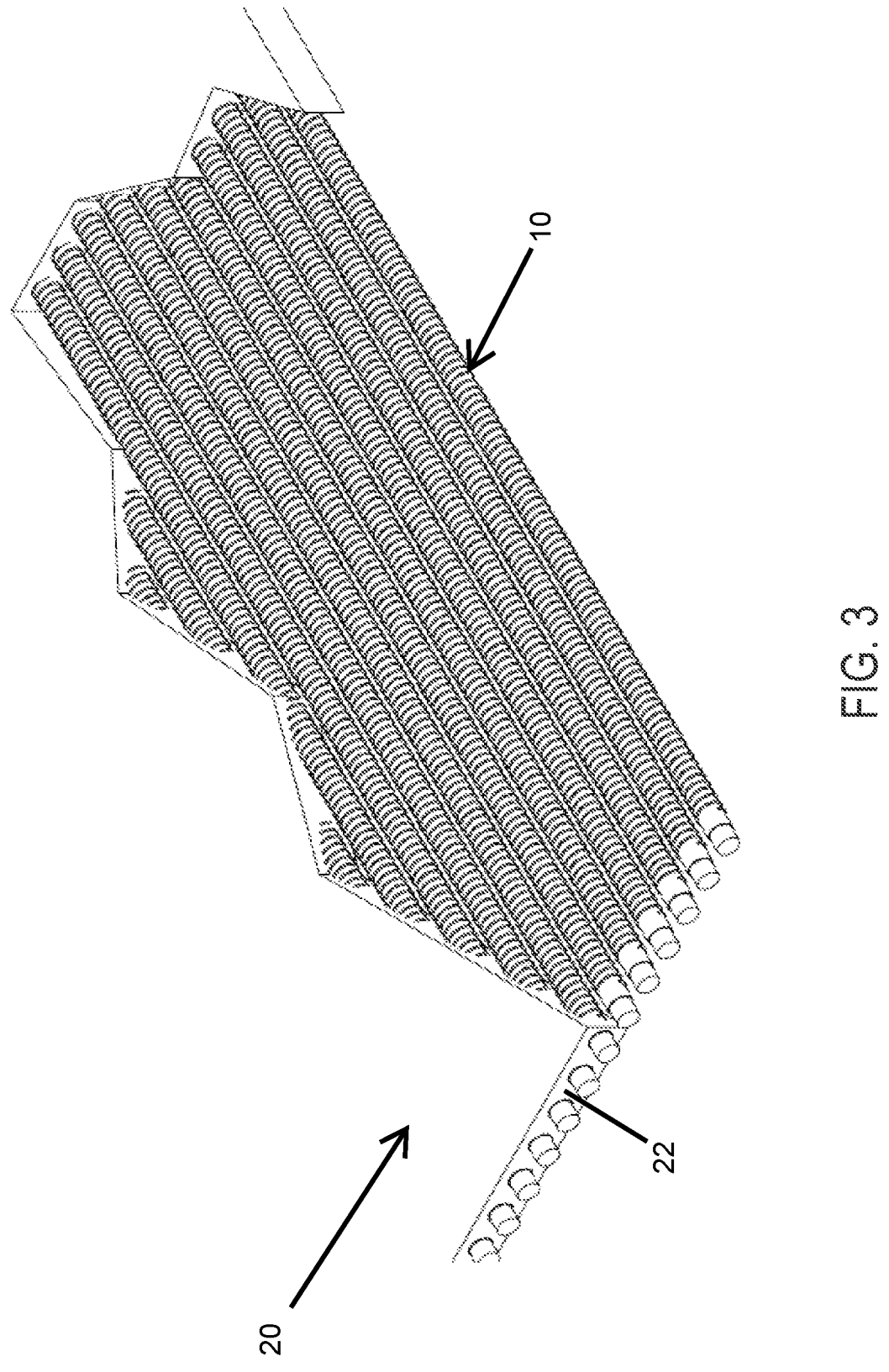
FIG. 3 is a cross-sectional view of a heating blanket comprising a first configuration of ferromagnetic wires.

Optionally, and such as shown in FIG. 2, a heating element 110 may include a ferromagnetic element 112 that has a varied pitch (i.e., the spacing between individual wraps of the ferromagnetic wire) along a length of the heating element 110. Thus, the ferromagnetic element 112 is more or less concentrated at positions along the length of the heating element 110 to provide varied heat distribution along the length of the heating element 110. Thus, instead of the ferromagnetic material being wrapped with a constant pitch (i.e., the spacing between individual wraps), the pitch may be varied along the length of the heating element. This allows the heating element to be tailored for the particular application and desired heating pattern of the heating element. For example, an application of the heating element may have heat applied around the perimeter of a heating blanket, but not in the middle, or more heat output is required around the perimeter to account for edge effect heat loss. The portion of the heating element disposed at the perimeter of the heating blanket may thus have a more highly concentrated (i.e., smaller pitch) portion of the ferromagnetic element as compared to the portion of the heating element at the middle of the heating blanket. Optionally, a pattern of heat may be generated and applied along each ferromagnetic element due to the varying pitch of the ferromagnetic element. Adjusting the pitch of the ferromagnetic wire allows the heat element to be customized as necessary to the criteria of the given application.

With reference to FIGS. 3-7, multiple heating elements 10, 110 may be embedded into a heating blanket substrate 22, such as a silicone sheet or an elastomer (FIG. 3) to create a heating blanket 20. Thus, a heating blanket 20 includes a plurality of heating elements 10 disposed within a substrate 22 (although shown as comprising heating elements 10, the heating blanket may comprise the constant pitch heating elements 10 of FIG. 1 or the varying pitch heating elements 110 of FIG. 2, depending on the particular application of the heating blanket). The heating elements may be distributed within the substrate 22 in any suitable configuration. In the illustrated embodiment of FIG. 3, the heating blanket 20 includes a plurality of heating elements 10 disposed parallel to one another and spanning the length of the substrate 22. The plurality of heating elements are evenly distributed throughout the substrate and form a single plane of heating elements. The substrate 22 in which the heating elements are disposed may vary depending on the intended use of the heating blanket. For example, the substrate may be a conformable or flexible silicone or a rigid and durable metal sheet, mold or tool.

Figure 4:
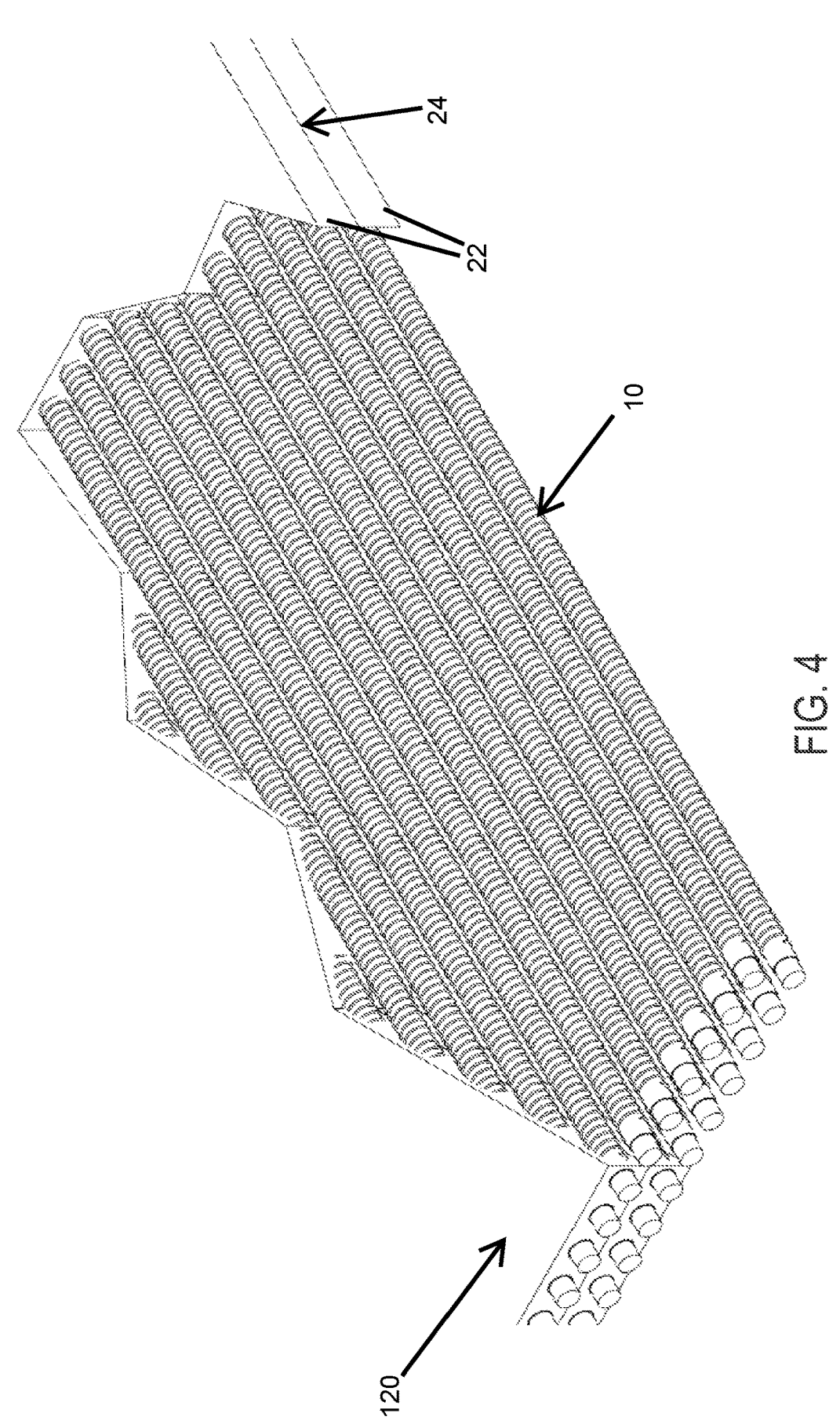
FIG. 4 is a cross-sectional view of another heating blanket comprising a second configuration of ferromagnetic wires.

Optionally, and such as shown in FIG. 4, a plurality of heating elements 10 may be embedded into separate substrates 22 with multiple substrate/heating elements separated from each other by an insulating layer or slip plane 24. Thus, the heating blanket 120 includes two substrates 22, each substrate comprising or accommodating a plurality of heating elements 10 disposed within the respective substrate, with the substrates separated by a slip plane 24.

The insulating layer or slip plane 24 may be a fiberglass fabric, metal mesh, plastic film, fluid, thermal grease, an air or gas, or any suitable material to provide thermal and/or magnetic and/or electrical insulation between one or more layers of heating elements. The insulating layer may be independent from the heating blanket and/or heating element construction or may be integrated into the construction of one or more elements of a system. Thus, the slip plane may be disposed between individual heating blankets, between substrates of a heating blanket, or between layers of heating elements within one substrate. The use of a slip plane between blankets, substrates and/or heating elements may reduce the stiffness of the assembled heating blanket allowing it to be more conformable. Additionally, an insulating layer or slip plane allows various substrates and/or heating elements to be used within the same system. For example, if a single operation requires 150 degrees F., 250 degrees F., and 350 degrees F. temperature dwells, and another operation requires just 150 degrees F. and 350 degrees F. dwells, the 250 degrees F. substrate and/or heating elements can be removed. The use of an insulating layer keeps the heating elements of different circuits thermally, electrically and/or magnetically insulated from each other and/or themselves. The layer can be incorporated into the substrate material such that the substrate and layer (either insulating or slip) appears to be incorporated into the substrate.

Figure 5:
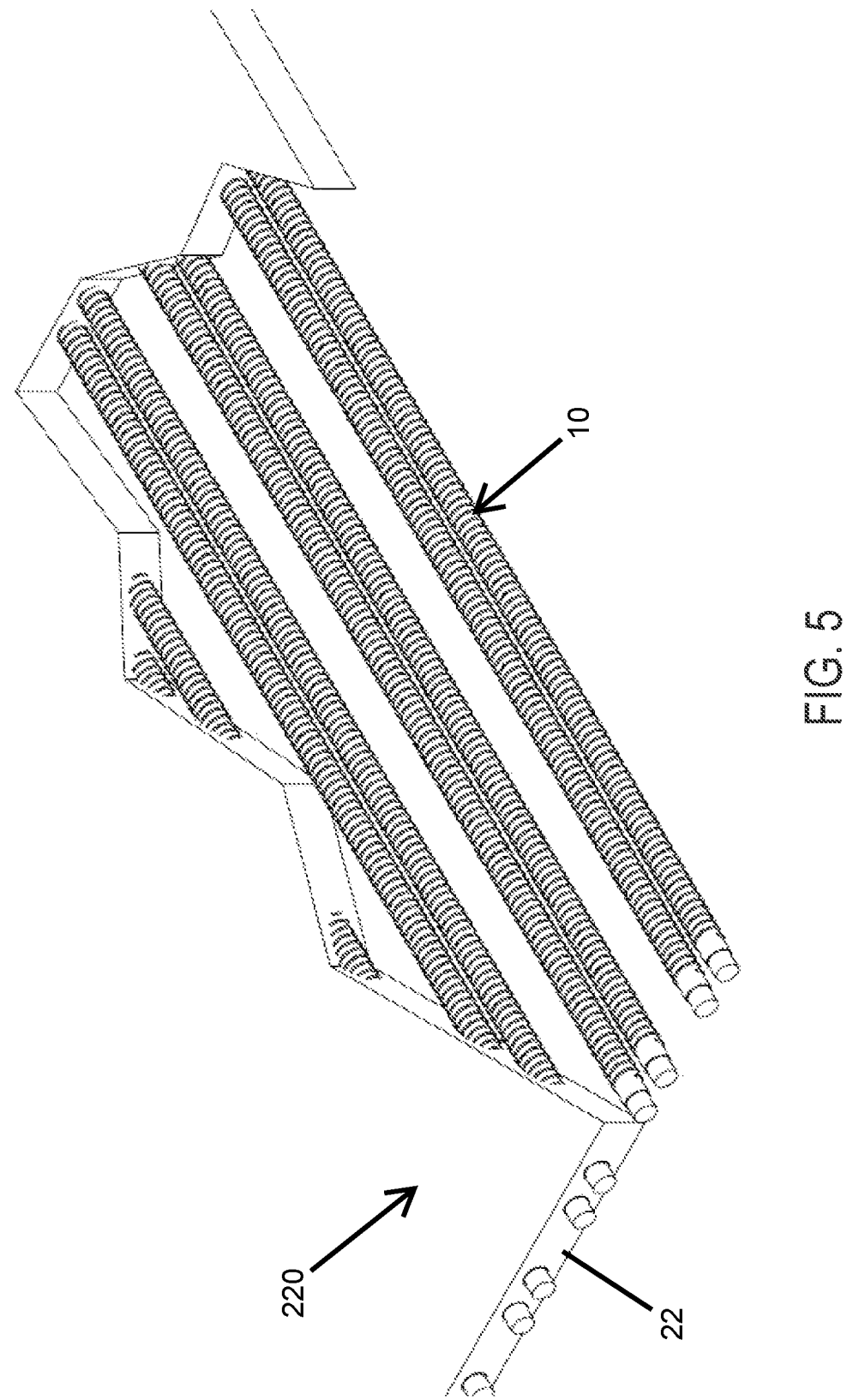
FIG. 5 is a cross-sectional view of another heating blanket comprising a third configuration of ferromagnetic wires.

Within the heating blanket substrate, the heating elements can be equally spaced (FIGS. 3 and 4) or specifically positioned to provide desired properties such as a more concentrated heat flux, magnetic fields that cancel each other, or magnetic fields that reinforce each other. For example, and as shown in FIG. 5, a heating blanket 220 may include heating elements 10 disposed within a substrate 22 where the heating elements are arranged in parallel pairs spaced relative to one another. In other words, a pair of heating elements may be disposed in close proximity to one another and spaced from another pair of adjacent heating elements.

Heating elements 10 of one type (i.e., of a particular heating temperature) may also be specially positioned in relation to heating elements 10 of another type (i.e., of another heating temperature) within the same or different layers of the heating blanket 20. For example, heating elements with 250 degrees F. and 350 degrees F. temperature Curie temperatures may be positioned such that a 250 degrees F. heating element is between a 350 degrees F. heating element in a repeating, alternating fashion. Similarly, two 250 degrees F. heating elements may be positioned followed by two 350 degrees F. elements; essentially alternating, but in pairs. An advantage of having single heating elements alternating is that the heating elements provide an even heat flux across the area of the blanket. An advantage of having pairs of heating elements alternating is the magnetic fields produced from the magnetic system couple together effectively and remain small.

Figure 6:
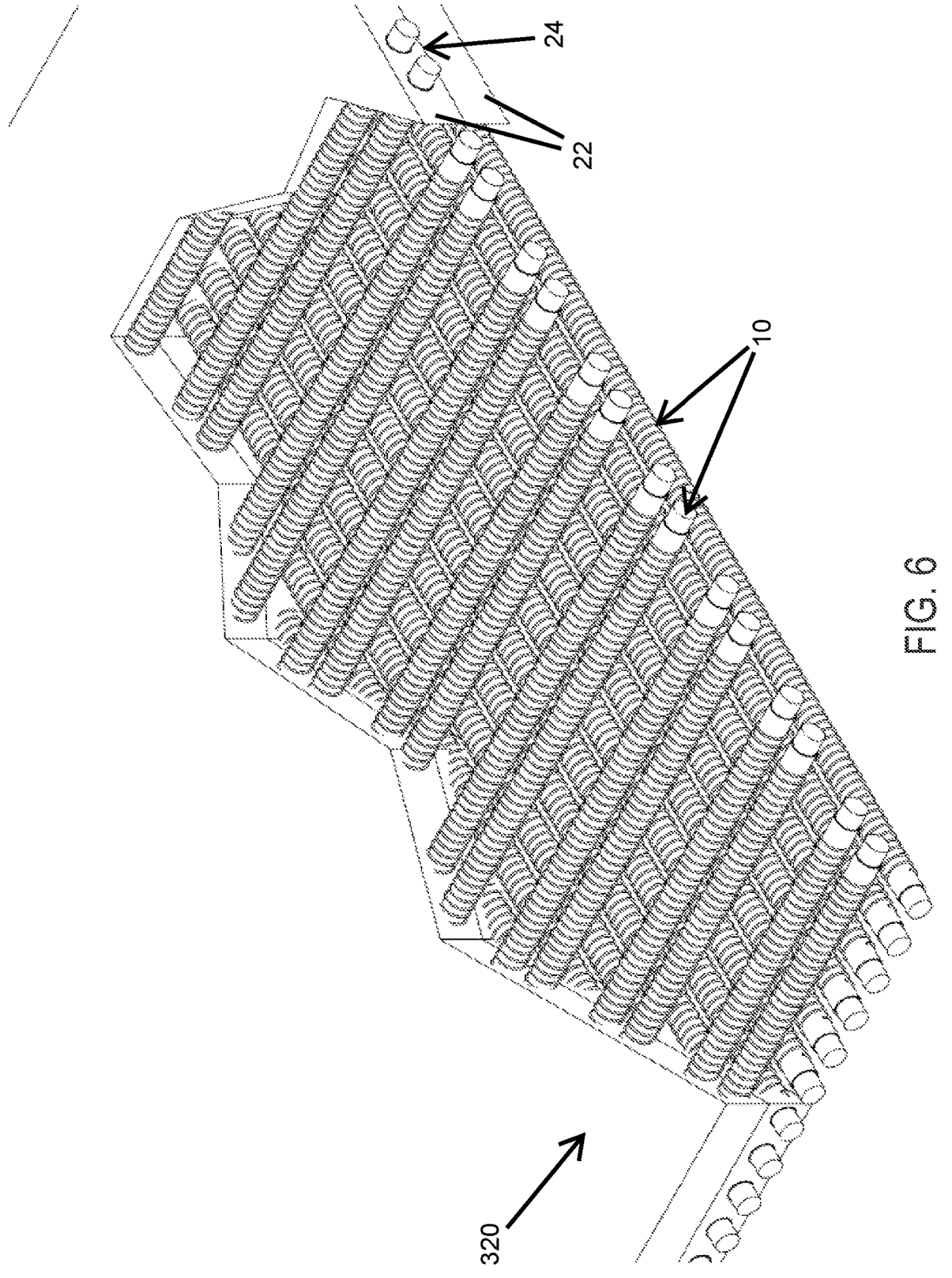
FIG. 6 is a cross-sectional view of another heating blanket comprising a fourth configuration of ferromagnetic wires.

Heating elements 10, regardless of the effective temperature, are not required to be positioned parallel with each other. For example, and such as shown in FIG. 6, a heating blanket 320 may include heating elements 10 that are positioned perpendicular relative to one another. Thus, the heating blanket 320 includes a first layer of heating elements 10 disposed in a substrate 22 and arranged parallel to one another in a first direction and the heating blanket 320 includes a second layer of heating elements 10 disposed in another substrate 22 arranged parallel to one another in a second direction perpendicular to the first direction, and the layers are separated by a slip plane 24. The heating elements may be configured to heat to any suitable temperature and thus the heating blanket 320 that consists of 250 degrees F. and 350 degrees F. heating elements may have the 250 degrees F. heating elements running perpendicular to the 350 degrees F. heating elements. This positioning may increase the overall thickness of the heating blanket 20, but helps prevent stray magnetic fields from the 250 degrees F. heating element from energizing the 350 degrees F. heating elements and vice versa. This provides an additional measure of maintaining precise temperature control.

Figure 7:
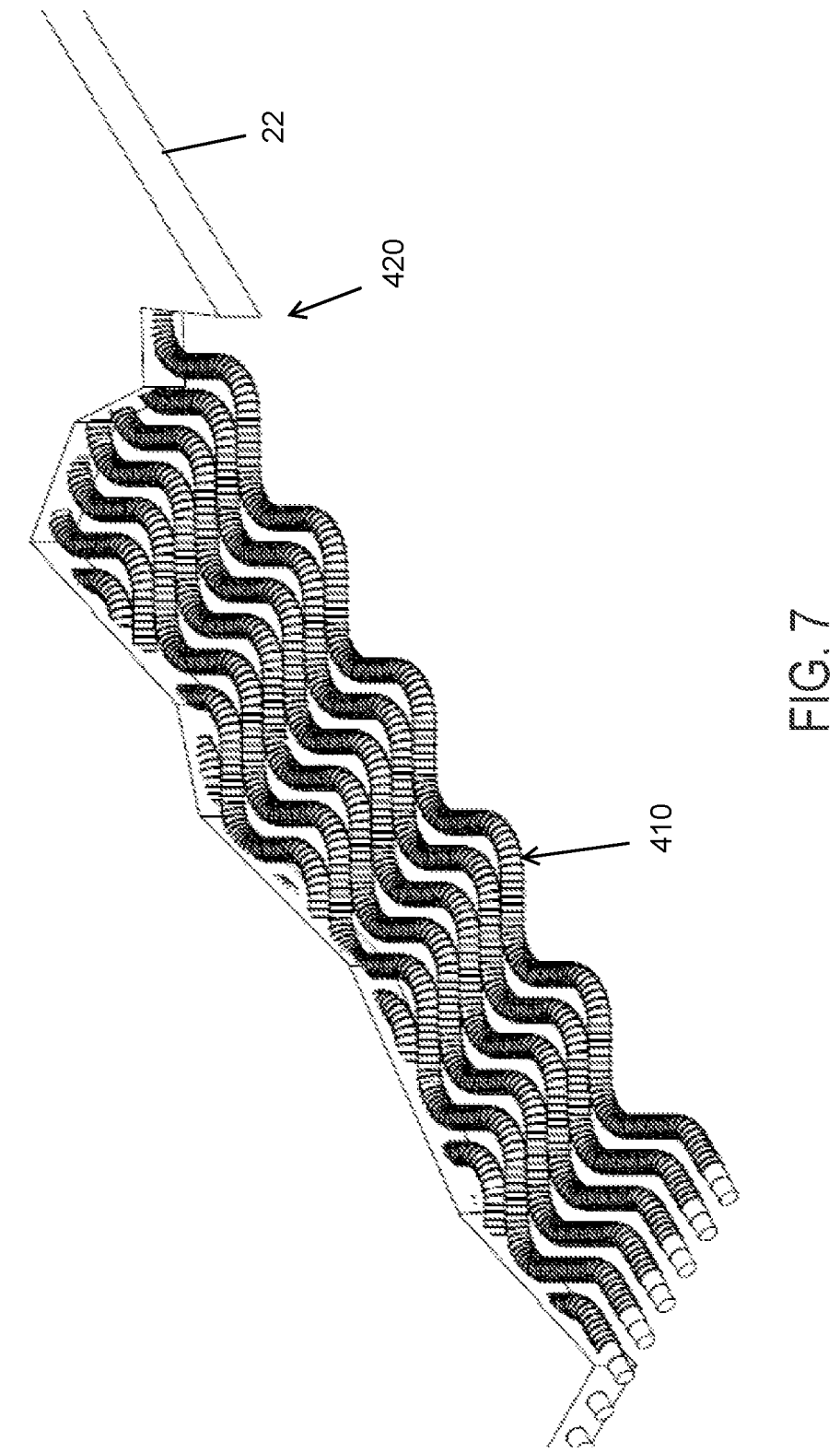
FIG. 7 is a cross-sectional view of another heating blanket comprising a fifth configuration of ferromagnetic wires.

Optionally, and such as shown in FIG. 7, a heating blanket 420 may include heating elements 410 in a wavy or zig-zag pattern or configuration to enable the heating blanket 20 to stretch or expand/contract and to more easily conform to a curved or non-planar surface. Thus, the heating elements 410 comprise a non-linear or curved shape and are disposed within the substrate 22 of the heating blanket in a non-linear configuration to allow for stretching and movement of the heating elements 410 within the heating blanket 420. The plurality of heating elements within the heating blanket may have the same non-linear configuration (i.e., they may have a non-linear pattern) or the configurations of the heating elements may be varied across the heating blanket.

The parent material of the heating blanket (e.g., silicone, elastomer, or the like) may be elastic or stretchy and conformable. When the heating elements are disposed in the substrate in a straight pattern or configuration (FIGS. 3-6), the heating elements have very little stretch to them, meaning that if the heating blanket is pulled parallel to the orientation of the heating elements, the heating elements carry the load and the heating blanket does not stretch. A zig-zag or wavy configuration gives the coils the ability to stretch and conform as the heating blanket stretches and conforms to the surface.

The construction of the heating element 10, and more specifically the ferromagnetic material wrapped around the electric wire was previously described as being strictly a ferromagnetic material, but may comprise a plurality of materials. For example, the core of the heating element may be a non-ferromagnetic material, such as copper, brass or aluminum, and coated, plated, or otherwise combined with the ferromagnetic material. Such a construction may be desirable to control eddy currents or stray induced currents that could cause unwanted joule heating.

The electromagnetic power supply that provides current to the heating blanket 20 may be a single source power supply or composed of multiple power sources each powering a specific heating element 10 or layer or set of heating elements. In the case of powering multiple heating elements through a single source power supply, power may be diverted from the power supply to the correct heating element and/or heating blanket through a series of contactors wherein the contactors are switches. Alternatively, a single source power supply may have its own internal switching capabilities. Multiple power supplies may be used to power a single blanket system wherein each power supply is paired to a specific blanket and/or heating element. In this situation, the power supplies may be controlled from a central control system.

Additionally, the heating elements 10 are not limited to heating blanket applications (i.e. being embedded in silicone or elastomer materials). The heating elements 10 can also be paired with hard tooling and layup mandrels. In this situation, the heating elements can be embedded, adhered, clipped, or otherwise attached to a surface, such as the backside of a layup mandrel. The heating of the wires 10 then heats the tooling and/or may be used to preheat or condition the temperature of fluids or other materials in contact with the tooling, such as air, water, oil, etc.

With reference to FIGS. 8-23, similar ferromagnetic heating elements or wires 510 may also be disposed in alternative applications such as laminated couplers 530 or disposed directly in the components to be bonded together. A method and/or process for joining, welding, bonding, co-bonding, hot-bonding, fusing, attaching, or affixing of two (2) or more components uses an electromagnetic field to heat one or more ferromagnetic structure(s). This technology harnesses high-speed electromagnetic heating in targeted areas to weld composite materials, including carbon fiber reinforced composites, with specially designed laminated couplers 530 or coupler-style features. A laminated coupler 530 may be constructed from carbon fiber or any suitable material such as fiberglass, plastic, organic polymer, a synthetic polymer such as Kevlar, a crystalline substance, an amorphous substance, a metalloid or semiconductor polymer (natural or man-made), a nanomaterial, a sintered or powdered material, a metallic material, or a composite material of any and all of the above. Fibers may be between 0.00001 inch and 1 inch thick.

Figure 8:
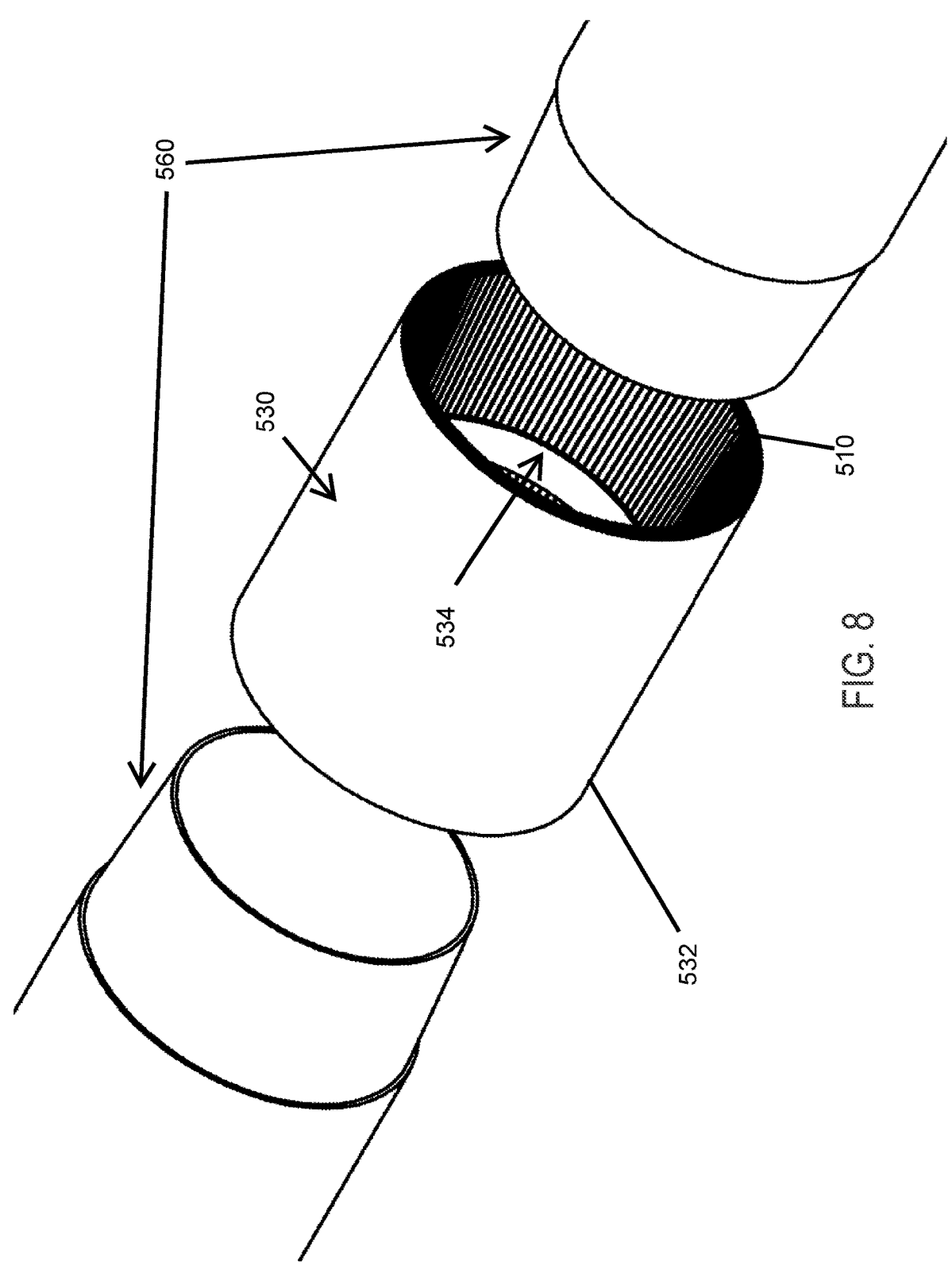
FIG. 8 is a perspective view of a laminated coupler comprising ferromagnetic wires between two components to be joined.

As shown in FIG. 8, ferromagnetic metal wires 510, spirals, or segments are added to attachment surfaces of the laminated coupler 530 to act as a heat source, and rapidly weld the mating surfaces of two parts 560 together, without

Figure 9:
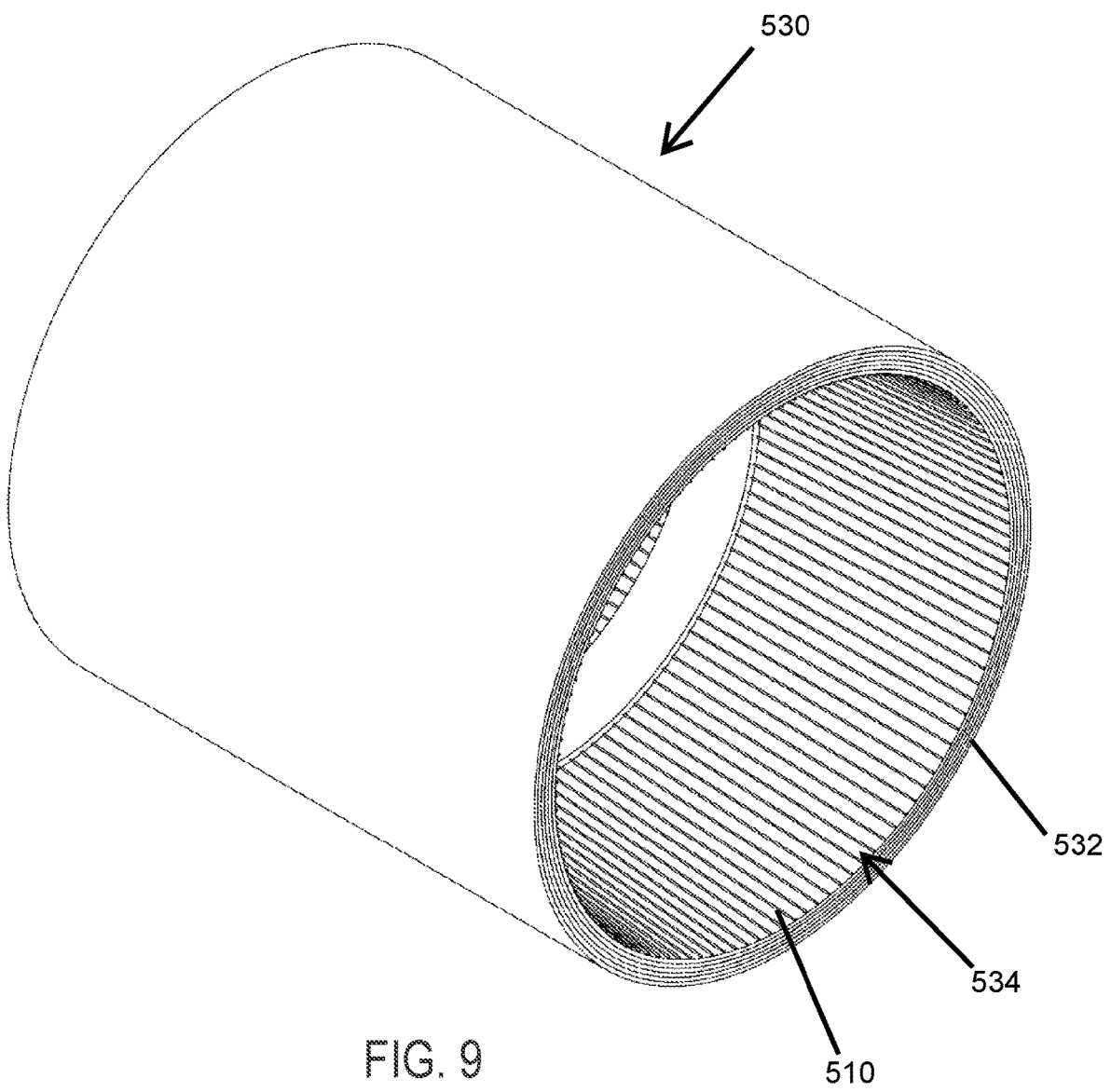
FIG. 9 is a perspective view of the laminated coupler of FIG. 8.
Figure 10:
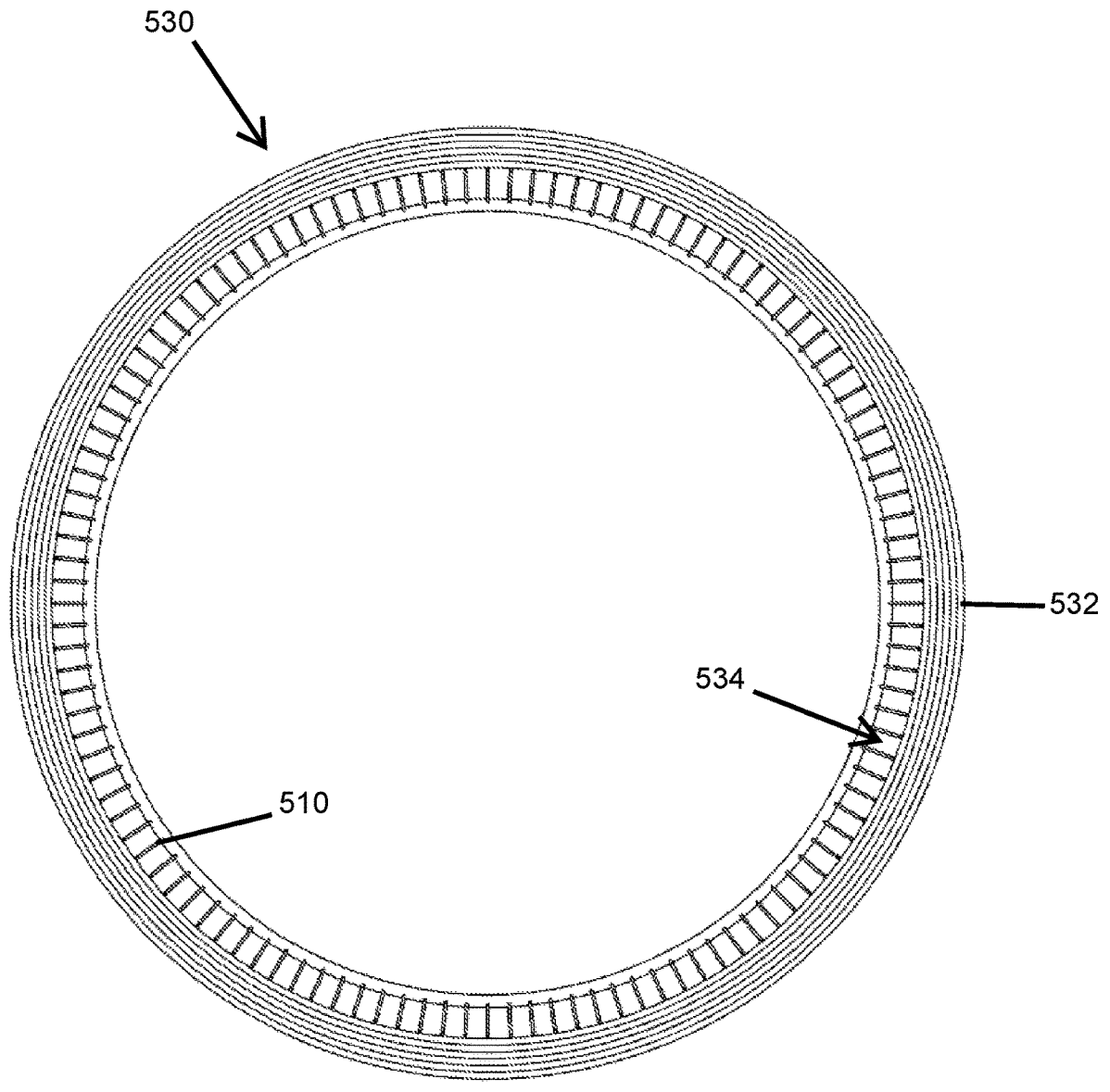
FIG. 10 is an end view of the laminated coupler of FIG. 8.
Figure 11:
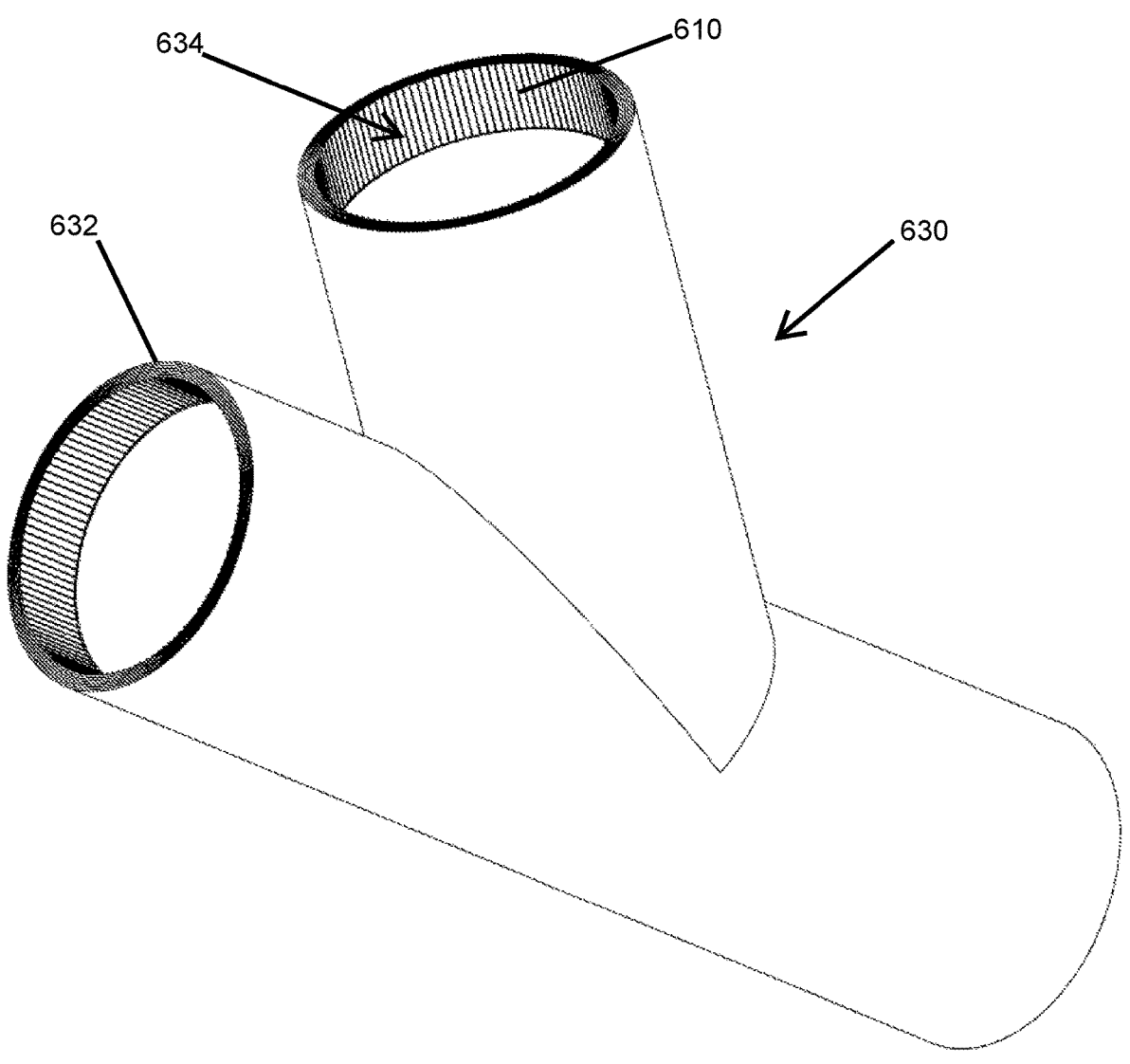
FIG. 11 is a perspective view of another laminated coupler comprising ferromagnetic wires.
Figure 20:
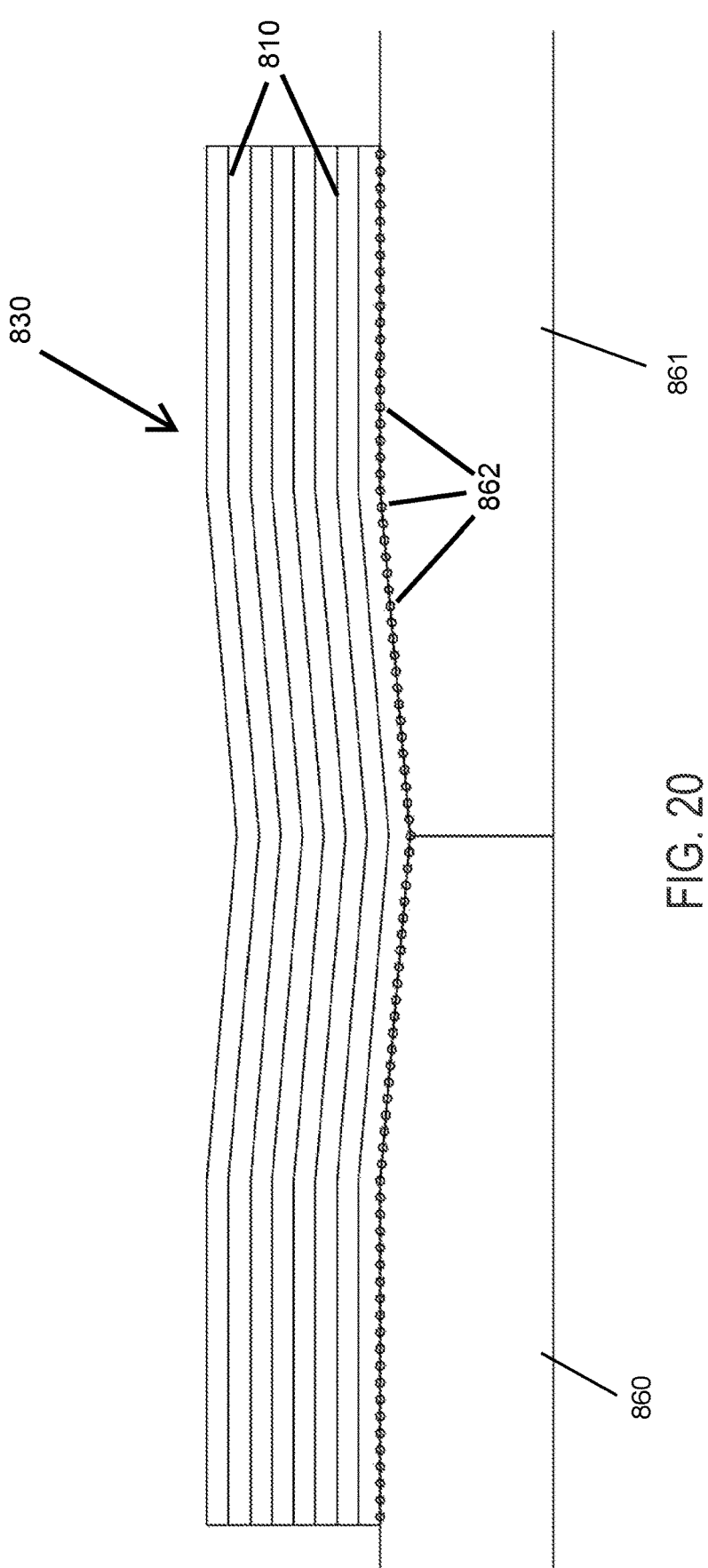
FIG. 20 is a cross-sectional view of a laminated coupler strip comprising ferromagnetic wires engaging two components to be joined.
Figures 21, 22:
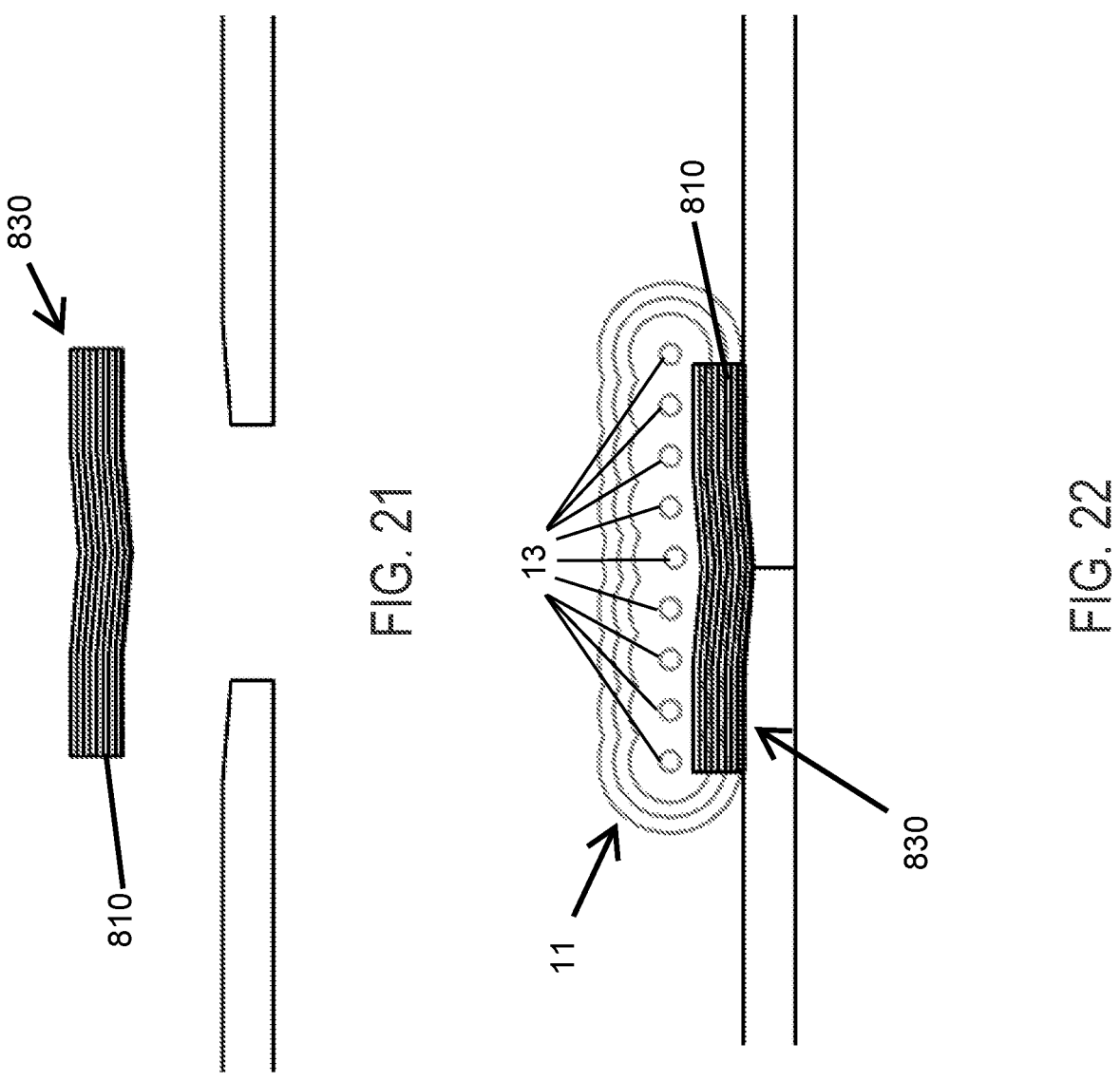
FIG. 21 is an exploded cross-sectional view of the laminated coupler strip and components of FIG. 20.
FIG. 22 is a cross-sectional view of the laminated coupler and components of FIG. 20 with the laminated coupler subject to a magnetic field.

10 heating their entire material thickness, thereby avoiding deformation and warping. As shown in FIGS. 8-10, the laminated coupler 530 may be a cylindrical receptor for joining two similarly oriented parts 560 together and may include ferromagnetic elements 510 disposed at a mating surface 534 of the composite structure 532 of the coupler 530. Optionally, and such as shown in FIG. 11, a laminated coupler 630 may comprise a cylindrical connector 630 having multiple receptors of any orientation configured to receive multiple components such that ferromagnetic elements 610 are disposed at each mating surface 634 of the composite structure 632 of the coupler 630. As shown in FIGS. 12-14, a laminated coupler and/or the ferromagnetic wires found in such a coupler may also be integrated into an attachment portion or surface or edge of one or more of the components to be joined. As shown in FIGS. 20-22, a laminated coupler 830 may also be a strip or pad to be attached or placed on two components to be joined.

A large difficulty of using electromagnetic heating on fiber-reinforced composites is that many commonly used fiber materials are sufficiently electrically conductive, in bulk form, to heat (often uncontrollably) in a high-frequency electromagnetic field when the field passes through the material in certain directions. For example, carbon fiber, one of the most commonly used composite reinforcements, exhibits this trait in its bulk form above a frequency of 30,000 Hz. The electromagnetic heating behavior of any given material is, in general, highly frequency-dependent and geometry-dependent. This is primarily because of a phenomenon known as the "skin effect." An oscillating electric current flowing in any electrically conductive material is concentrated most at the surface of the material and decreases exponentially at increasing depths from the conductor's surface. The so-named "skin depth" is a unit distance away from the material's surface such that the current density decreases by about 63 percent for each unit of skin depth. The skin depth of a material depends on its electrical conductivity, magnetic permeability, and the applied frequency of the magnetic field. In practice, this means that if a cross section of a conductor (such as a wire) is taken perpendicular to the direction of a magnetic field (such as a circular cross section of that wire), and that cross-section's size (or radius in the case of a circular cross section of a wire) is smaller than the material's skin depth at that frequency, its electromagnetic heating will be negligible.

An example of this frequency and geometry-dependent electromagnetic heating is of the heating of carbon fiber layers, when the carbon fibers have a diameter between 0.004 inch and 0.040 inch. As discussed above, electromagnetic heating has been observed in carbon fiber in its bulk form at magnetic field frequencies 30,000 Hz and above. Given that the magnetic field frequencies required for the efficient heating of ferromagnetic wires of similar size are often much higher frequencies than 30,000 Hz, this effect absolutely must be mitigated to avoid unwanted heating of the carbon fibers surrounding any ferromagnetic heating element present. Thus, the carbon fiber layers comprise fibers having a diameter of less than the skin depth of the carbon fiber material (at the applied electromagnetic frequency or frequencies) to reduce or limit or avoid heating of the carbon fiber layers during electromagnetic heating of the material to be joined.

With reference to FIG. 9, a laminated coupler 530 in accordance with the present invention exploits electromagnetic properties to allow an electromagnetic field to heat ferromagnetic wires 510 located behind or within a fiber-reinforced composite structure 532 of the coupler 530, where a high-frequency field would otherwise be unable to pass through the bulk composite material without heating it uncontrollably. Thus, the laminated coupler 530 enables the magnetic field to pass through the composite material of the coupler only so far as to reach the ferromagnetic wires at the attaching surface without subjecting the bulk composite material to the magnetic field, thereby heating only the ferromagnetic material surrounding, wrapped around, or otherwise disposed at or comprising the wire 510 without electromagnetically heating the material of the coupler or parts 560 joined by the coupler itself or themselves. While the ferromagnetic wires 510 within the coupler 530 (when comprising electrically conductive material) may be electrically charged to create the requisite magnetic field (similar to the embodiment discussed above), because of the mentioned properties of composite materials frequently used in or joined by such couplers, this usage would be inappropriate in many situations.

In other words, a ferromagnetic material disposed within a laminated coupler made of a composite material can be subjected to a magnetic field sourced outside of the coupler (the magnetic field is not created by passing electric current through the ferromagnetic wire within the coupler). Otherwise, if subjected to the magnetic field in an undesired way, the composite material may heat uncontrollably, potentially morphing, deforming or otherwise harming the material. Laminated couplers in accordance with the present invention enable the electromagnetic heating of the ferromagnetic wires via exterior electromagnets or wire coils. A magnetic field created exterior the coupler thus will not cause uncontrollable heating of the composite material because the magnetic field is absorbed or otherwise blocked before reaching the composite material via the ferromagnetic material wrapped or coating or surrounding the electric wire and thereby providing the heating element.

The ferromagnetic wire or material 510 located in the coupler (preferably at a mating surface 534 of the coupler) may comprise just the ferromagnetic material or may be affixed to an electrically conductive wire. For example, the ferromagnetic material may be plated, coated, hot-dipped, sprayed, painted, 3D printed, or otherwise attached to a suitably conductive material, such as copper, silver, gold, aluminum, magnesium, chromium, or any compound or alloy of these materials. In other embodiments the ferromagnetic wire (having a diameter between 0.0001 inch and 0.1 inch or 1 inch) or ferromagnetic material may be a strip (having a thickness between 0.001 inch and 1 inch), a mesh of wires (having any mesh density between 1 percent and 99 percent), a square or rectangular wire (having height and width between 0.001 inch and 0.1 inch), or an electrically conductive material having these characteristics with a ferromagnetic material disposed exterior. Thus, targeted and specific heating (and therefore bonding, welding or coupling) may be achieved via any variety of shape or material of ferromagnetic wire or material without undesired heating of the bulk composite material.

Figure 15:
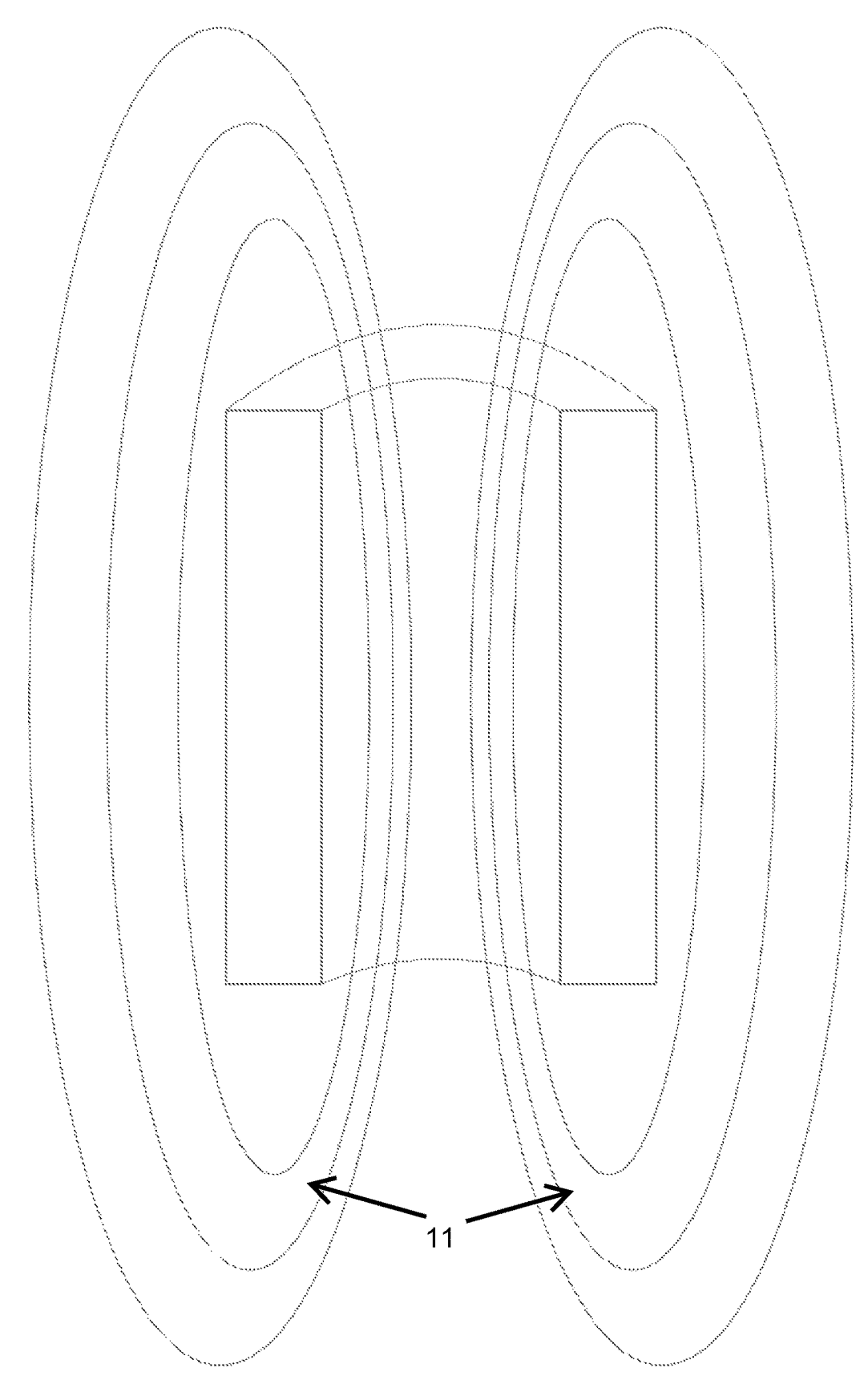
FIG. 15 is a cross-sectional view of a tubular coil and its magnetic field.
Figure 17:
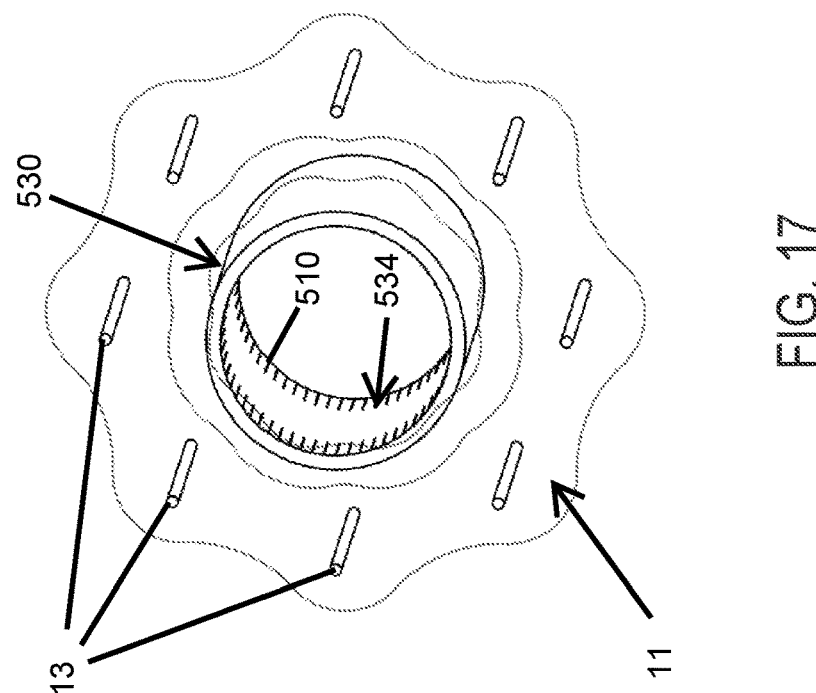
FIGS. 17-19 are various perspective views of the laminated coupler and magnetic field of FIG. 16.
Figure 16:
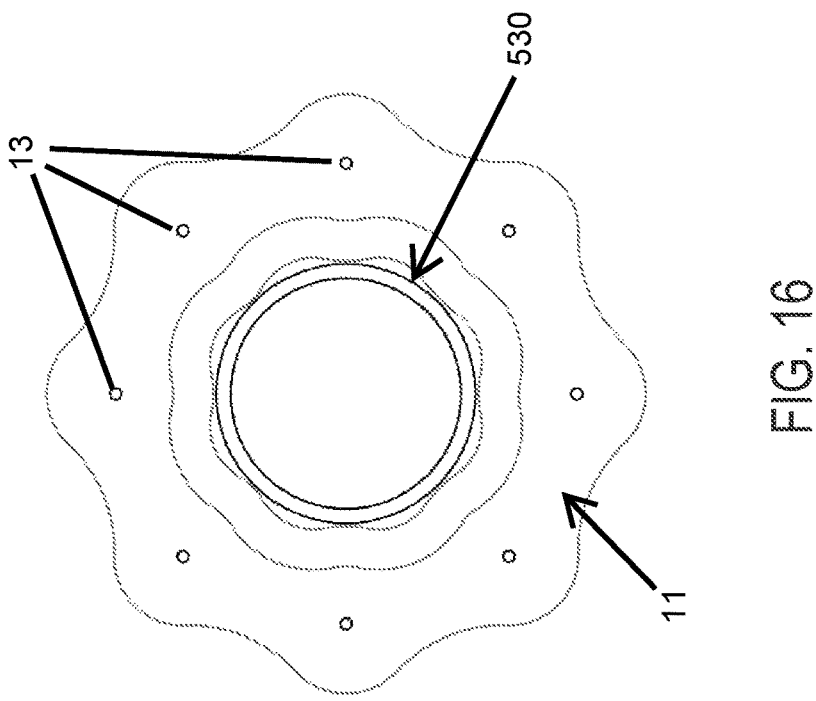
FIG. 16 is an end view of the laminated coupler of FIG. 8 subject to the magnetic field of multiple exterior magnetic field sources.
Figure 18:
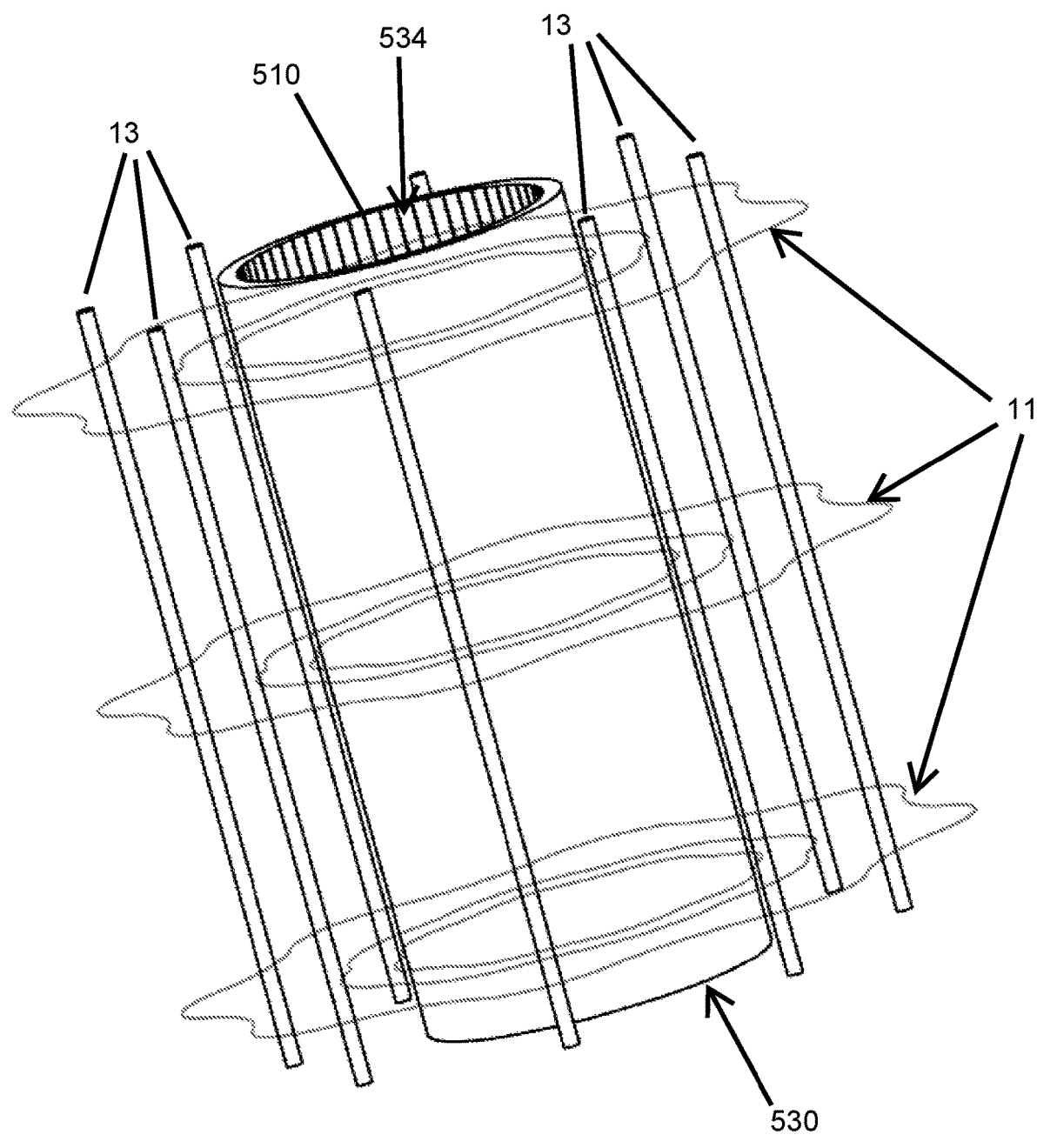
Figure 19:
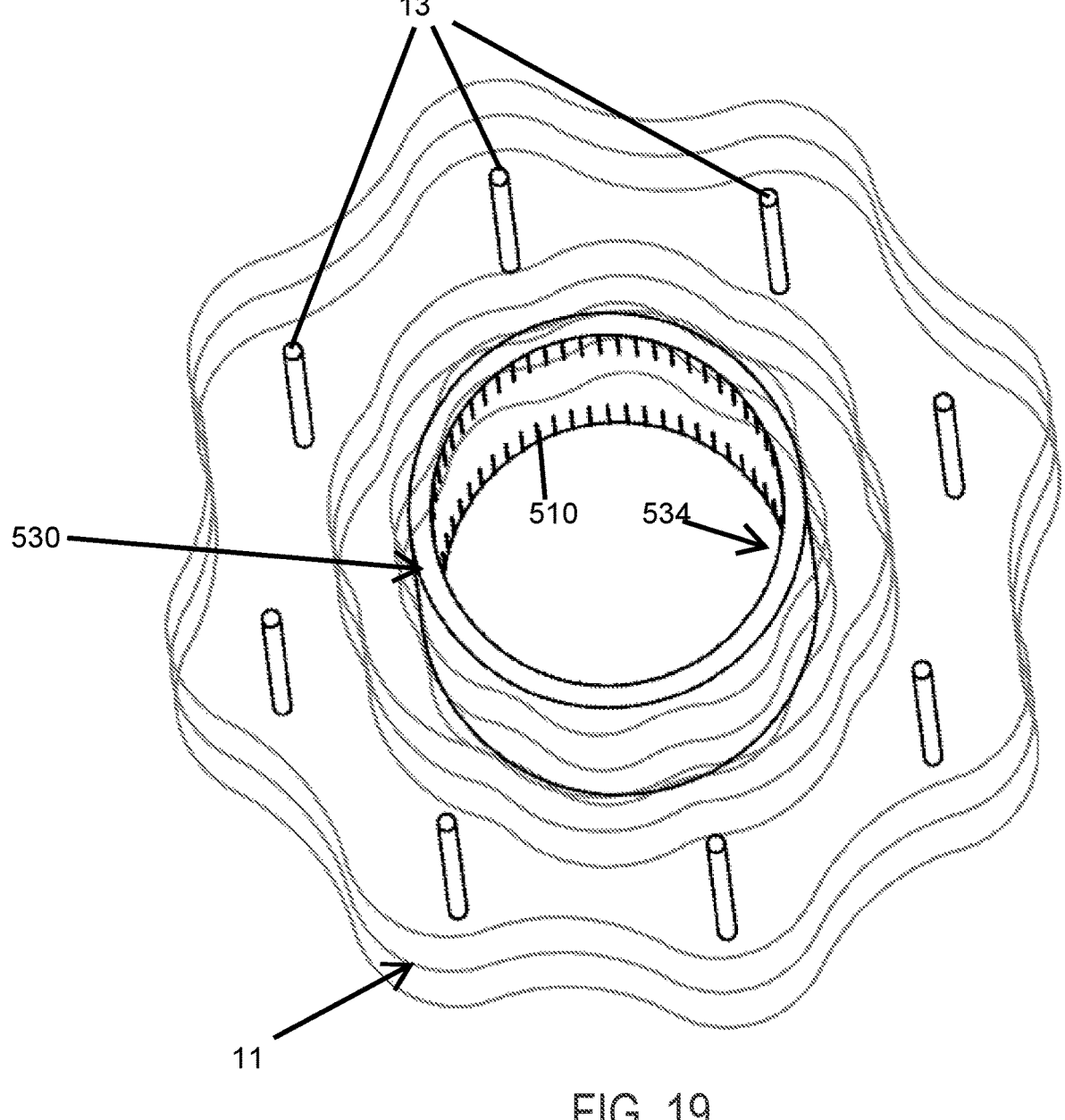

For example, a method of joining two or more components using a laminated structure of the present invention in conjunction with an exterior generated magnetic field may be described with reference to FIGS. 12-14. A cross-section of two components 760, 761 joined in an overlapping arrangement are shown, the top component 760 depicted with a laminated edge section. Ferromagnetic wires 710 are disposed within the laminated edge and are heated via a magnetic field 11 (FIG. 15). The magnetic field 11 interacts with the ferromagnetic wires 710, heating them rapidly and causing the two components to join along their mating surface (represented by mating points 762). The magnetic field (via interaction with the ferromagnetic wires) may be the only heat source applied to the materials or used in conjunction with any other suitable heat source. The magnetic field may be applied constantly over a given period of time and evenly concentrated over an application area or may be focused, concentrated, condensed, weakened, diffused, diffracted, or otherwise modified in its absolute magnitude as suitable in any location near enough to be relevant to the heated joining area, for example, by any flux concentrator, magnetic shield, and/or solenoidal core. The magnetic field may also have any periodic or non-periodic waveform, superposition of such waveform, and applied with any frequency at any cycle length (such as pulsed or continuous), as suitable for the needs of the application.

The magnetic field may be applied to the ferromagnetic wires in any suitable fashion. For example, one or more electric wires or magnetic coils may be used to generate the requisite magnetic field. FIG. 14 depicts three magnetic field sources 13 disposed above the laminated structure to be heated. A tubular coil may also be used to apply a magnetic field to a ferromagnetic structure placed inside. FIG. 15 depicts a cross-section of an example of a tubular coil and its electromagnetic field 11. When the cylindrical laminated coupler 530 is used with integrated ferromagnetic wires 510, such as depicted in FIGS. 16-19, multiple magnetic coils may surround the coupler 530, emanating a magnetic field 11 to heat the ferromagnetic wires 510 disposed at the mating surface 534 within. As shown, the magnetic field 11 is substantially blocked or absorbed by the ferromagnetic wires 510, effectively protecting any composite material within the coupler from being subjected to the magnetic field 11. As shown in FIG. 22, when the laminated coupler is a pad or strip 830 placed atop two components 860, 861 to be joined via the coupler 830 (FIGS. 20 and 21), a series of magnetic coils 13 may be oriented above the strip 830 to heat the integrated ferromagnetic wires 810 via the magnetic field 11 and the components 860, 861 may join to the coupler 830 along the mating points 862.

This process is particularly useful in complex structures, where the carbon fibers themselves may be oriented in different directions in each layer, to improve mechanical stiffness in particular directions. Another benefit of this arrangement is that the ferromagnetic heating target material acts as a partial magnetic shield to the non-laminated composite material beyond itself, as it is highly electrically conductive.

The lamination layers in the coupler (carbon fiber and otherwise) may be arranged such that they mimic the orientation(s) of the components to be joined, and in so doing, provide unbroken mechanical strength properties through the joint region.

This technology is also well-suited to repair applications, as it easily accommodates and/or replaces the need for surface welding (i.e. where only one side of a large substrate may be practically accessible for attaching a surface-welded repair piece).

Figure 23:
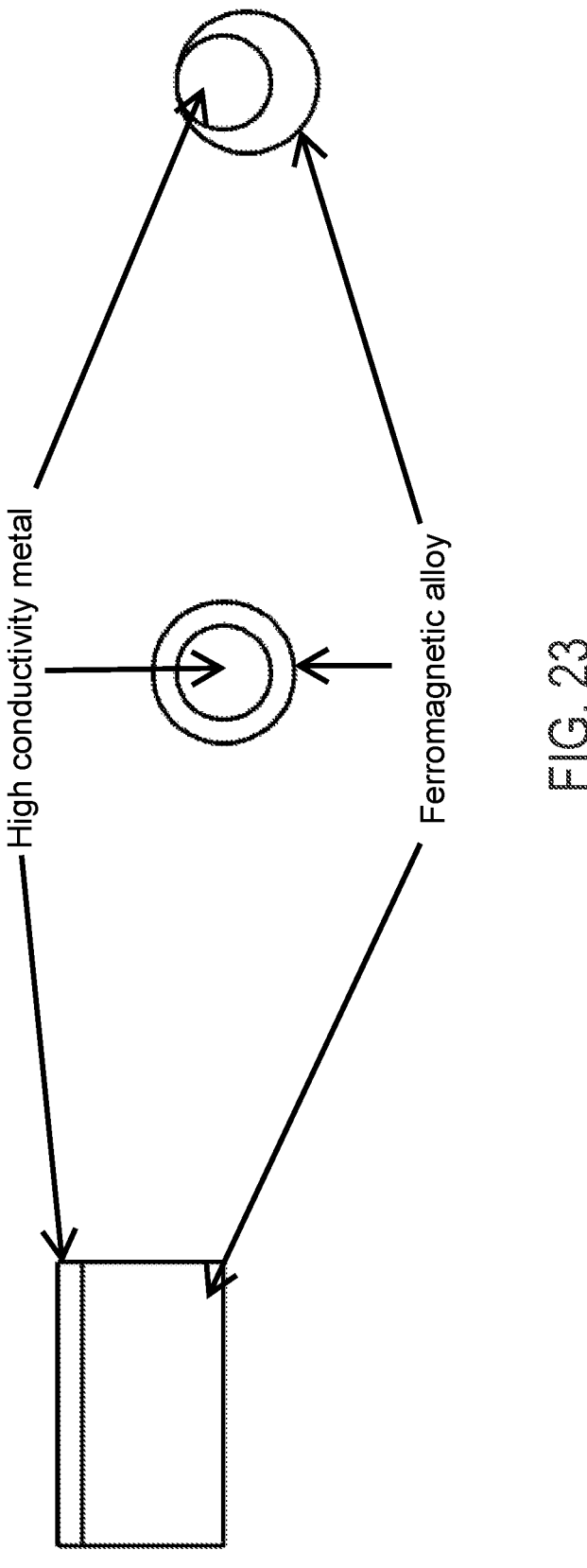
FIG. 23 is a cross-sectional view of various embodiments of a ferromagnetic wire.

The welding method using ferromagnetic wires can be refined by attaching a nonferrous, highly electrically conductive path to the main wire, or including one in the wire's construction, for example, by electroplating the ferromagnetic wire or material as a coating on a smaller copper wire. This enables easier regulation of the wire's Curie temperature in at least two ways. First, by providing an alternate electrical path for the magnetically induced currents, paramagnetic overheating beyond the Curie temperature is minimized. In other words, stray currents are able to escape the material via the copper wire rather than cause unwanted heating in the composite material. Second, the presence of a metal such as copper with a very high thermal conductivity tends to improve heating uniformity. Thus, as long as the ferromagnetic material is not magnetically shielded from the electromagnetic field by the copper or other highly electrically conductive material, a multi-material wire often improves heating control characteristics. As shown in FIG. 23, the highly electrically conductive material may coat or cover a top or upper or outer surface of the ferromagnetic alloy. Optionally, the highly electrically conductive material may form a core of a wire that is completely or at least partially surrounded by the ferromagnetic alloy.

The correlation between heating wire size and optimal electromagnetic field frequency may be also be exploited by including multiple diameters of wires in the same area to be heated, allowing a variable-frequency field source to preferentially heat certain local areas more quickly than others at different times, or to fine-tune a heating distribution across a weld's mating surfaces for any other reason.

Thus, a ferromagnetic heating system may include a ferromagnetic heating element disposed at a substrate. The ferromagnetic heating element includes an electrically conductive material and a ferromagnetic material. A power source is configured to electrically charge the electrically conductive material to create a magnetic field at the ferromagnetic heating element. Optionally, the ferromagnetic material may be disposed at an exterior surface of the electrically conductive material. Optionally, the insulation layer may be disposed between the ferromagnetic material and the electrically conductive material.

Optionally, the substrate may be a heating blanket and the heating element may include a plurality of ferromagnetic wires disposed within the volume of the heating blanket. The plurality of ferromagnetic wires may respectively include ferromagnetic materials having the same Curie temperature or different Curie temperatures (and thus the materials heat to and do not exceed the same or different threshold temperatures). Within the blanket, the plurality of ferromagnetic wires may be arranged in a single plane, next to and parallel to each other. Optionally, no ferromagnetic wire of one ferromagnetic material may be next to another ferromagnetic wire of the same ferromagnetic material. Optionally, the ferromagnetic wires may be arranged in a plurality of planes and the ferromagnetic wires of each plane may be arranged parallel to one another. Each plane may include ferromagnetic wires of the same ferromagnetic material and the planes may be arranged so that the ferromagnetic wires run perpendicular to one another. The planes of ferromagnetic wires may be separated by an insulation layer.

A method for joining components using a laminated structure may include providing a laminated structure that includes a structure configured to engage one or more components and a ferromagnetic heating element disposed at or near a mating surface of the laminated structure. The method may further include engaging the mating surface of the laminated structure with one or more components and, while engaging the mating surface of the laminated structure with the one or more components, applying heat to the laminated structure and the one or more components via the ferromagnetic heating element.

Optionally, applying heat to the laminated structure and the one or more components via the ferromagnetic heating element may include applying a magnetic field to the ferromagnetic heating element to heat the ferromagnetic heating element via induction heating. For example, the magnetic field may be applied by operating an electromagnet in proximity to the laminated structure. The ferromagnetic heating element may include an electrically conductive material and a ferromagnetic wire having a known Curie temperature. Applying the magnetic field may thus include applying an electric current to the electrically conductive material of the ferromagnetic heating element to generate a magnetic field at the ferromagnetic heating element. Optionally, applying the magnetic field may include operating an electromagnet in proximity to the laminated structure to heat the ferromagnetic material of the ferromagnetic heating element and the electrically conductive material receives and disperses transverse flux currents.

A ferromagnetic heating element may include a magnetic field source that includes an electrically conductive material and a power source configured to electrically power the magnetic field source. When the power source electrically powers the magnetic field source, the magnetic field source applies a magnetic field to a ferromagnetic material and the ferromagnetic material heats via induction heating.

Optionally, the ferromagnetic material may be disposed at the electrically conductive material, and when the power source powers the magnetic field source, an electric current passes through the electrically conductive material. For example, the electrically conductive material may include an electromagnetic coil or a Litz wire or a plurality of wires.

Optionally, the ferromagnetic material may be disposed at a substrate such as a heating blanket. The magnetic field source may be disposed in the material of the heating blanket and the ferromagnetic material may be disposed at an exterior surface of the electrically conductive material. The substrate may be a fiber-reinforced composite material.

A method of heating may include using a heating blanket and using electromagnetic heating, where the heating blanket includes ferromagnetic heating elements embedded in one or more substrates and specific heating elements of the ferromagnetic heating elements target specific temperatures. Optionally, the specific heating elements and substrate(s) may be separated from other specific heating elements and substrate(s) by a slip plane or an insulating layer. The insulating layer may be integral to the structure of the heating blanket or the insulating layer may be independent of the structure of the heating blanket. The insulating layer may be formed from a material such as fabric, plastic, metal, copper mesh, fluid, fiberglass plastic, polytetrafluoroethylene (PTFE) plastic, or any highly conductive material, thermal grease, or air.

Optionally, the ferromagnetic heating elements may be positioned and/or spaced to provide tailored results including tailored results of heat flux density, temperature, magnetic field cancelation and magnetic field reinforcement. The ferromagnetic heating elements are in the same plane of the heating blanket and may include alternating types of ferromagnetic elements. Optionally, the ferromagnetic elements may be alternating adjacent pairs of ferromagnetic elements. Optionally, the ferromagnetic heating element of one type may be angled with respect to the ferromagnetic heating element of another type. For example, the ferromagnetic heating element of one type may be perpendicular to the ferromagnetic heating element of another type. Optionally, the ferromagnetic heating elements may not be in the same plane of the heating blanket. The one or more substrate may include a metal.

The one or more substrates may include a tool for processing composites, plastics, metals, or fluids. For example, the substrate may include a processing tool such as a layup mandrel or mold. Optionally, the processing tool may be used for controlling heating and cooling of pipes during joining, forming, and/or other fabrication processes. The processing tool may be used to preheat and/or condition a fluid such as air, water, or oil.

A method of heating may include using a heating blanket and electromagnetic heating, where the heating blanket includes ferromagnetic heating elements and the ferromagnetic heating elements include ferromagnetic materials and non-ferromagnetic materials. The ferromagnetic heating elements may have non-ferromagnetic cores such as aluminum, copper, brass, or the like and one or more materials may be electrically conductive.

A heated joining method for materials may include providing one or more components to be joined, providing one or more laminated structures contacting or nearby a joining region, and heating one or more ferromagnetic wires or structures in the joining region via an electromagnetic field energy source.

Optionally, the one or more laminated structures may include one or more discrete coupler components connecting, bridging, and/or linking the one or more components to be joined. The one or more laminated structures may be integral to the one or more components to be joined. The one or more laminated structures may include laminations that include alternating Carbon Fiber and any of (i) fiberglass, (ii) plastic, (iii) organic polymer or plastic (iv) synthetic polymer, such as Kevlar, (v) crystalline substance, (vi) amorphous substance, (vii) metalloid or semiconductor polymer, whether natural or man-made, (viii) nanomaterial, (ix) sintered or powdered material, (x) metallic material rendered suitable for this use through any current or future method, or (xi) a composite material combining any of these material types. Optionally, the one or more laminated structures may include fibers of any size between 0.00001 inch and 1 inch, with their principal axis oriented in any direction. Optionally, the one or more ferromagnetic wires may be included to enable targeted electromagnetic heating and are: (i) pre-installed in the one or more laminated structures, (ii) pre-installed in the one or more components to be joined, or (iii) applied to mating surfaces involved at the time of assembly for the heated joining method. The one or more ferromagnetic wires may include more than one material, including at least one non-ferrous material. The one or more ferromagnetic wires may have any alloy composition and Curie temperature.

The electromagnetic field energy source may be the only source of heat energy for the one or more ferromagnetic wires in the joining method. Optionally, the electromagnetic field energy source may contribute only part of the heat energy to the one or more ferromagnetic wires for the joining method. Optionally, an electromagnetic field used for the joining method may be generated by the electromagnetic field energy source that includes one or more coils of any shape, in any orientation relative to the one or more components, in any location about the one or more components such that electromagnetic heating from the generated electromagnetic field is sufficient to perform the heated joining method, including any multiple-coil arrangement producing a field such that, while insufficient to perform the operation with a field from any one coil, a combined field is sufficient. Thus, any multi-coil arrangement generating the electromagnetic field may be used such that any number of arranged coils are actually energized at a given point in time. Optionally, the electromagnetic field may be generated by one or more coils with any finite number of conductors per coil, or any cross-sectional geometry. Optionally, the generated electromagnetic field may be focused, concentrated, condensed, weakened, diffused, diffracted, or otherwise modified in its absolute magnitude in any location (except by the inverse square law) near enough to be relevant to the joining region, for example, by any flux concentrator, magnetic shield, solenoidal core, and/or the like. The electromagnetic field produced may be reflected, refracted, absorbed, or otherwise redirected by any applied effect.

Optionally, the electromagnetic field may be constant or non-constant in its magnitude and/or direction with respect to space and/or time, and having any periodic or non-periodic waveforms, or superposition of such waveforms, at any frequency (for continuously varying fields) or any duty cycle lengths (for pulsed or discontinuously varying fields), or any combination of these with respect to time (for example, triangular or square waveforms).

An electromagnetic heating device may include one or more materials, including at least one exhibiting ferromagnetism, and therefore a defined Curie temperature, to convert electromagnetic energy from a changing field to heat energy.

Optionally, the electromagnetic heating device may include a shape of (i) a wire of between 0.001 inch and 0.1 inch in diameter and finite length, (ii) a thin strip between 0.001 inch and 1 inch in thickness, (iii) any mesh composed of wires of the given sizes, of any mesh density between 1 percent and 99 percent, or (iv) a rectangular wire with a height and/or width between 0.001 inch and 0.1 inch, and any finite length. The electromagnetic heating device may be contacting, affixed, embedded, or otherwise in contact with one or more solid, fluid, or plasma-state materials. The at least one ferromagnetic material may be plated, coated, hot-dipped, sprayed, painted, 3D-printed, or otherwise attached to a wire or strip of (i) copper, (ii) silver, (iii) gold, (iv) aluminum, (v) magnesium, (vi) chromium (vii) a compound, alloy, or mixture of these materials, or (viii) a superconducting material with a critical temperature between 3 kelvins and 5800 kelvins.

Optionally, the electromagnetic heating device may include a single, continuous piece, or any finite number of separate pieces. The electromagnetic heating device may be energized by an oscillating field having a waveform shape of (i) sinusoidal, (ii) triangle, (iii) square, or (iv) constant or variable-magnitude pulses between 100 and 1,000,000 pulses per second, of any duty cycle of between 1 percent and 99 percent. The electromagnetic heating device may be attached to a welding mate surface. Optionally, the electromagnetic heating device may be pre-attached to or pre-embedded in another material before use, and/or to facilitate its use.

A method of providing heat may include providing an electromagnetic coil, providing a ferromagnetic material with a known Curie temperature in proximity to the electromagnetic coil, and providing a pulsed direct current (DC) electrical current to the electromagnetic coil.

Optionally, the electromagnetic coil may include a Litz wire, such as a Litz wire having a diameter between 0.001 inch and 0.01 inch. The known Curie temperature of the ferromagnetic material may be between 50 degrees Fahrenheit and 2,100 degrees Fahrenheit. The pulsed DC current may be pulsed between 500 and 5,000,000 times per second, such as between 3,000 and 500,000 times per second.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A method for performing heated joining of materials, the method comprising:

providing a component to be joined with another component;

providing one or more laminated structures in proximity to a joining region of the component, wherein the one or more laminated structures comprise one or more ferromagnetic elements;

with the one or more laminated structures in proximity to the joining region, generating heat at the joining region by exposing the one or more ferromagnetic elements of the one or more laminated structures to an electromagnetic field; and wherein the one or more ferromagnetic elements have a respective Curie temperature, and wherein, when the one or more ferromagnetic elements are exposed to the electromagnetic field, the one or more ferromagnetic elements generate heat at the joining region at a temperature that does not exceed the respective Curie temperature; and wherein the heat generated by the one or more ferromagnetic elements when the one or more ferromagnetic elements are exposed to the electromagnetic field is the only heat source at the joining region.

2. The method of claim 1, wherein the one or more laminated structures comprise one or more coupler components connecting the component to the other component.

3. The method of claim 1, wherein the one or more laminated structures are integrally formed with the component to be joined with the other component.

4. The method of claim 1, wherein the one or more ferromagnetic elements are integrally formed with the one or more laminated structures.

5. The method of claim 1, wherein one or more secondary ferromagnetic elements are integrally formed with the component to be joined with the other component.

6. The method of claim 1, wherein the one or more ferromagnetic elements comprise a first material and a second material different from the first material, and wherein the first material comprises a non-ferrous material.

7. The method of claim 1, wherein the one or more ferromagnetic elements comprises an alloy, the alloy defining the respective Curie temperature.

8. The method of claim 1, wherein the one or more ferromagnetic elements comprises an electrically conductive material and a ferromagnetic material.

9. A method for performing heated joining of materials, the method comprising:

providing a component to be joined with another component;

providing one or more laminated structures in proximity to a joining region of the component, wherein the one or more laminated structures comprise one or more ferromagnetic elements;

with the one or more laminated structures in proximity to the joining region, generating heat at the joining region by exposing the one or more ferromagnetic elements of the one or more laminated structures to an electromagnetic field;

wherein the one or more ferromagnetic elements have a respective Curie temperature, and wherein, when the one or more ferromagnetic elements are exposed to the electromagnetic field, the one or more ferromagnetic elements generate heat at the joining region at a temperature that does not exceed the respective Curie temperature; and wherein the one or more laminated structures comprise alternating laminations of Carbon Fiber and a material different from Carbon Fiber.

10. The method of claim 9, wherein the material comprises one selected from the group consisting of (i) a fiberglass material, (ii) a plastic material, (iii) an organic polymer material, (iv) a synthetic polymer material, (v) a crystalline material, (vi) an amorphous material, (vii) a metalloid polymer material, (viii) a nanomaterial, (ix) a powdered material, (x) a metallic material, and (xi) a composite material.

11. A method for performing heated joining of materials, the method comprising:

providing a component to be joined with another component;

providing one or more laminated structures in proximity to a joining region of the component, wherein the one or more laminated structures comprise one or more ferromagnetic elements;

with the one or more laminated structures in proximity to the joining region, generating heat at the joining region by exposing the one or more ferromagnetic elements of the one or more laminated structures to an electromagnetic field;

wherein the one or more ferromagnetic elements have a respective Curie temperature, and wherein, when the one or more ferromagnetic elements are exposed to the electromagnetic field, the one or more ferromagnetic elements generate heat at the joining region at a temperature that does not exceed the respective Curie temperature; and wherein the one or more laminated structures comprise fibers having diameters between 0.00001 inch and 1 inch.

12. A method for performing heated joining of materials, the method comprising:

providing a component to be joined with another component;

providing one or more laminated structures in proximity to a joining region of the component, wherein the one or more laminated structures comprise one or more ferromagnetic elements;

with the one or more laminated structures in proximity to the joining region, generating heat at the joining region by exposing the one or more ferromagnetic elements of the one or more laminated structures to an electromagnetic field;

wherein the one or more ferromagnetic elements have a respective Curie temperature, and wherein, when the one or more ferromagnetic elements are exposed to the electromagnetic field, the one or more ferromagnetic elements generate heat at the joining region at a temperature that does not exceed the respective Curie temperature; and wherein the method comprises generating heat at the joining region via the electromagnetic field and a secondary heat source.

13. The method of claim 12, wherein the one or more laminated structures comprise one or more coupler components connecting the component to the other component.

14. The method of claim 12, wherein the one or more laminated structures are integrally formed with the component to be joined with the other component.

15. The method of claim 12, wherein the one or more ferromagnetic elements are integrally formed with the one or more laminated structures.

16. The method of claim 12, wherein one or more secondary ferromagnetic elements are integrally formed with the component to be joined with the other component.

17. The method of claim 12, wherein the one or more ferromagnetic elements comprise a first material and a second material different from the first material, and wherein the first material comprises a non-ferrous material.

18. The method of claim 12, wherein the one or more ferromagnetic elements comprises an alloy, the alloy defining the respective Curie temperature.

19. The method of claim 12, wherein the one or more ferromagnetic elements comprises an electrically conductive material and a ferromagnetic material.

20. A method for performing heated joining of materials, the method comprising:

providing a component to be joined with another component;

providing one or more laminated structures in proximity to a joining region of the component, wherein the one or more laminated structures comprise one or more ferromagnetic elements;

with the one or more laminated structures in proximity to the joining region, generating heat at the joining region by exposing the one or more ferromagnetic elements of the one or more laminated structures to an electromagnetic field;

wherein the one or more ferromagnetic elements have a respective Curie temperature, and wherein, when the one or more ferromagnetic elements are exposed to the electromagnetic field, the one or more ferromagnetic elements generate heat at the joining region at a temperature that does not exceed the respective Curie temperature; and wherein the electromagnetic field is generated by an electromagnetic field energy source, and wherein the electromagnetic field energy source comprises an electromagnetic coil.

21. The method of claim 20, wherein the electromagnetic coil comprises a plurality of electromagnetic coils, and wherein each electromagnetic coil of the plurality of electromagnetic coils is selectably energizable to generate a respective electromagnetic field.

22. The method of claim 20, wherein the electromagnetic coil comprises a plurality of conductors.

23. The method of claim 20, wherein the electromagnetic field is modified at or near the joining region via the electromagnetic field energy source.

24. The method of claim 20, wherein the electromagnetic field is redirected at or near the joining region via the electromagnetic field energy source.

25. A method for performing heated joining of materials, the method comprising:

providing a component to be joined with another component;

providing one or more laminated structures in proximity to a joining region of the component, wherein the one or more laminated structures comprise one or more ferromagnetic elements:

with the one or more laminated structures in proximity to the joining region, generating heat at the joining region by exposing the one or more ferromagnetic elements of the one or more laminated structures to an electromagnetic field;

wherein the one or more ferromagnetic elements have a respective Curie temperature, and wherein, when the one or more ferromagnetic elements are exposed to the electromagnetic field, the one or more ferromagnetic elements generate heat at the joining region at a temperature that does not exceed the respective Curie temperature; and wherein exposing the one or more ferromagnetic elements to the electromagnetic field comprises operating an electromagnet remote from and in proximity to the one or more laminated structures.

* * * * *